(12) United States Patent
Ford, III et al.

(10) Patent No.: US 7,978,206 B2
(45) Date of Patent: Jul. 12, 2011

(54) LOOK-UP TABLE ACTION

(75) Inventors: John G. Ford, III, Mill Valley, CA (US); Phillip D. Beymer, Victoria (CA)

(73) Assignee: Autodesk, Inc., San Rafael, CA (US)

( * ) Notice: Subject to any disclaimer, the term of this patent is extended or adjusted under 35 U.S.C. 154(b) by 1013 days.

(21) Appl. No.: 11/564,104

(22) Filed: Nov. 28, 2006

(65) Prior Publication Data

US 2007/0120576 A1 May 31, 2007

Related U.S. Application Data

(60) Provisional application No. 60/740,524, filed on Nov. 28, 2005.

(51) Int. Cl.
G09G 5/00 (2006.01)

(52) U.S. Cl. ........................................................ 345/619

(58) Field of Classification Search .................. 345/619, 345/588, 473, 474; 703/6, 7; 715/964
See application file for complete search history.

(56) References Cited

U.S. PATENT DOCUMENTS

| | | | |
|---|---|---|---|
| 4,912,657 A | 3/1990 | Saxton et al. | |
| 4,974,175 A | 11/1990 | Suzuki et al. | |
| 5,165,015 A | 11/1992 | Coggins | |
| 5,265,197 A * | 11/1993 | Kondo | 345/420 |
| 5,548,707 A | 8/1996 | LoNegro et al. | |
| 5,610,833 A | 3/1997 | Chang et al. | |
| 5,856,828 A | 1/1999 | Letcher, Jr. | |
| 5,861,889 A | 1/1999 | Wallace et al. | |
| 5,870,088 A | 2/1999 | Washington et al. | |
| 5,877,778 A * | 3/1999 | Dow et al. | 345/474 |
| 6,128,023 A | 10/2000 | Kawashima | |
| 6,289,255 B1 | 9/2001 | Shah et al. | |
| 6,360,357 B1 * | 3/2002 | Cesare | 717/168 |
| 6,512,519 B1 | 1/2003 | Arsenault et al. | |
| 6,714,201 B1 * | 3/2004 | Grinstein et al. | 345/474 |
| 6,889,101 B1 | 5/2005 | Gudmundsson et al. | |
| 6,928,330 B2 | 8/2005 | Kawai et al. | |
| 6,931,602 B1 * | 8/2005 | Silver et al. | 715/771 |
| 7,019,759 B1 * | 3/2006 | Moore et al. | 345/619 |
| 7,079,907 B2 | 7/2006 | Kimura et al. | |
| 7,427,995 B2 | 9/2008 | Farrah | |
| 7,437,684 B2 * | 10/2008 | Maille et al. | 715/852 |
| 7,509,590 B2 * | 3/2009 | O'Rourke et al. | 715/853 |

(Continued)

OTHER PUBLICATIONS

Non-Final Office Action from U.S. Appl. No. 11/455,008, dated Jan. 2, 2009, 15 pages.

(Continued)

*Primary Examiner* — Ryan R Yang
(74) *Attorney, Agent, or Firm* — Fish & Richardson P.C.

(57) ABSTRACT

A first block represents a two or three dimensional object in a Computer Aided Design (CAD) model, and has a visual presentation in a presentation of the CAD model based on a first plurality of property values denoted by a first label in a plurality of labels. User input specifying a new value for a first property value in the first plurality of property values is received. A second plurality of property values denoted by a second label is selected. The second plurality of property values differs by at least one value from the first plurality of property values and the second plurality of property values has a second property value that is satisfied by the new value. The visual presentation of the first block is updated based on the second plurality of property values.

30 Claims, 35 Drawing Sheets

U.S. PATENT DOCUMENTS

| | | | |
|---|---|---|---|
| 7,571,392 B2* | 8/2009 | Cortesi | 715/765 |
| 2002/0165701 A1 | 11/2002 | Lichtenberg et al. | |
| 2002/0191001 A1 | 12/2002 | Felser et al. | |
| 2003/0061238 A1 | 3/2003 | Atkinson | |
| 2003/0088389 A1* | 5/2003 | Balaniuk et al. | 703/2 |
| 2005/0071804 A1 | 3/2005 | Miserocchi | |
| 2007/0120714 A1 | 5/2007 | Beltran et al. | |
| 2007/0120870 A1 | 5/2007 | Ford et al. | |

OTHER PUBLICATIONS

Non-Final Office Action from U.S. Appl. No. 11/455,288, dated Jul. 29, 2008, 7 pages.
Final Office Action from U.S. Appl. No. 11/455,288, dated Jan. 9, 2009, 6 pages.
Non-Final Office Action from U.S. Appl. No. 11/455,288, dated Apr. 3, 2009, 8 pages.
Final Office Action from U.S. Appl. No. 11/455,008, dated May 15, 2009, 15 pages.
Final Office Action from U.S. Appl. No. 11/455,288, dated Oct. 20, 2009, 11 pages.
Regli, et al., "Managing Digital Libraries for Computer-Aided Design," Computer Aided Design 32 (2000), 14 pages.
Narrative description provided in the attached Information Disclosure Statement of a data structure that was used in AutoCAD software application available from Autodesk, Inc. of San Rafael, California; Fig 1. schematically illustrating the data structure, 2006.
NetValley.com, Internet Valley archives, Company News, "Award-Winning Autodesk Actrix Technical Ships," Nov. 30, 1998, [online], Retrieved from the Internet: http://www.netvalley.com/archives/97companynews/autodesk.html, retrieved on Oct. 28, 2008, 4 pages.
Autodesk, "Actrix™ Technical Developer's Guide," Chapters 2, 3, 6, 7 and 8, Nov. 1998, 106 pages.
Autodesk, "Actrix™ Technical User's Guide," Chapter 5 and p. 194, Nov. 1998, 18 pages.
Chang, E. and Katz, R., "Inheritance in Computer-Aided Design Databases: Semantics and Implementation Issues," 22 pages, 2002.
Chou, S. and Huang C., "A Software Product Model Emphasizing Relationships", IEEE Xplore, pp. 417-426, 2001.
Hoffman, C. and Joan-Arinyo, R., "CAD and the Product Master Model," Computer-Aided Design, 30(11):905-918, 1998.
Miles, J., et al., "Versioning and Configuration Management in Design Using CAD and Complex Wrapped Objects," Artificial Intelligence in Engineering, Elsvier Science Ltd., 14:249-260, 2000.

* cited by examiner

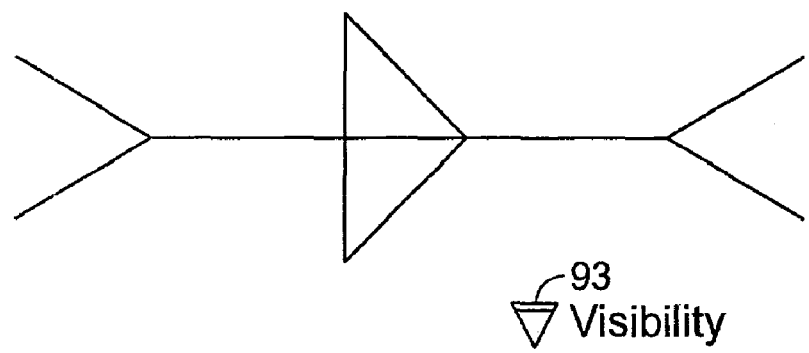
FIG. 11C
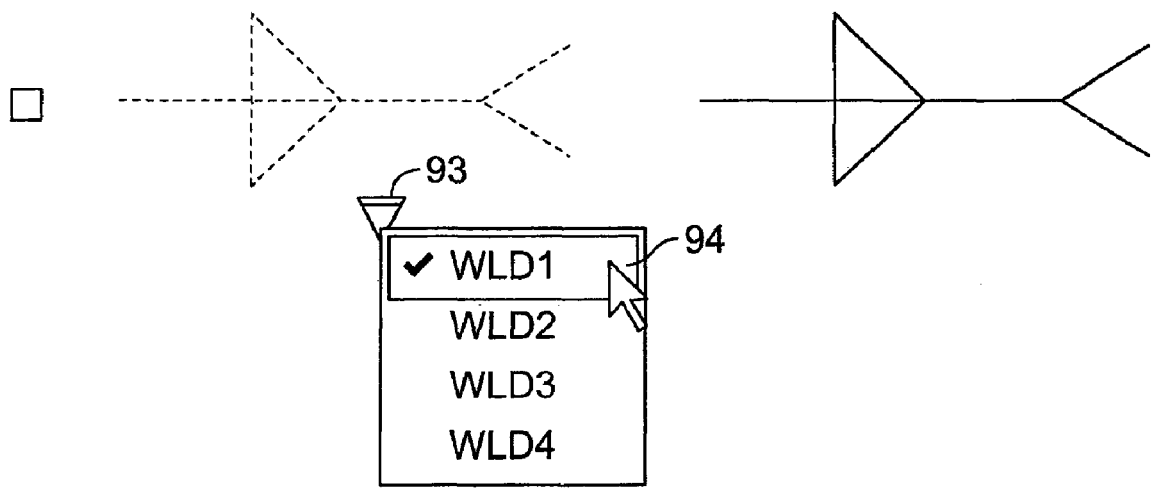
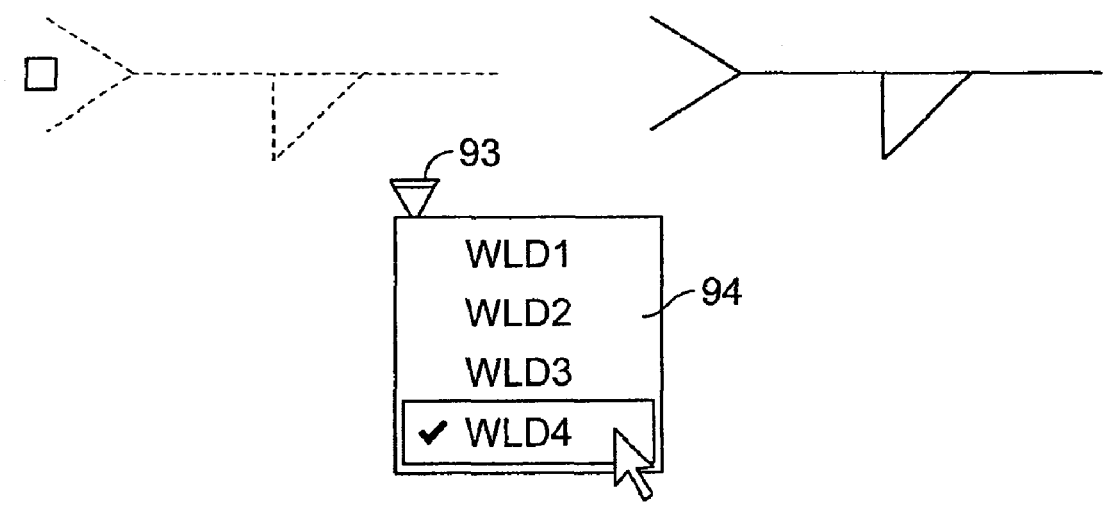
FIG. 11D

| class / object | specific name | type / derived from | defining table | per instance data table | comments |
|---|---|---|---|---|---|
| AcDbDynamicBlockPurgePreventer | block representation (anonymous) | AcDbBlockRepresentationData | | | a self reference that, by its presence, prevents purge of the anonymous block when read into earlier versions of AutoCAD |
| AcDbBlockRepresentation | | AcDbDictionary | T1 | | held by extension dictionary |
| AcDbRepData | AcDbRepresentationData | AcDbXRecord | T2 | | |
| AppDataCache | | AcDbDictionary | T3 | | held by the AcDbBlockRepresentation dictionary |
| <application name>DATA | ACAD_ENHANCEDBLOCKDATA | AcDbDictionary | T4 | | held by the AcDbBlockRepresentation dictionary, contains instance specific application data |
| Graph Node ID | | AcDbXRecord | T5 | | held by the <application name>DATA dictionary, this AcDbXRecord is created for each node in the graph that needs to save per instance data |
| <application name>HISTORY | ACAD_ENHANCEDBLOCKHISTORY | AcDbXRecord | T6 | | held by the <application name>DATA dictionary, this AcDbXRecord is created when a dynamic block, requiring a history, is manipulated. For each manipulation of a node, a history entry is written. Each history entry consists of the following. held by the AcDbBlockRepresentation dictionary, created if a block that did not require a history, is redefined such that it now requires a history. This is a snapshot of the contents of the <application name>DATA dictionary at the time the block is redefined. |
| <application name>HDATA | ACAD_ENHANCEDBLOCKHDATA | AcDbDictionary | T7 | | |
| AcDbImpEvalExpr | | AcDbObject | T8 | | base class for evaluation nodes in the graph |
| AcDbBlockElement | | AcDbEvalExpr | T9 | | base class for dynamic block elements |
| AcDbBlockAction | | AcDbBlockElement | T10 | TT1 | base class for all actions in dynamic blocks |
| AcDbBlockGrip | | AcDbBlockElement | T11 | | base class for all grips in dynamic blocks |
| AcDbBlockParameter | | AcDbBlockElement | T12 | | base class for all parameters in dynamic blocks |
| AcDbBlockActionWithBasePt | | AcDbBlockAction | T13 | TT2 | |
| AcDbBlockArrayAction | | AcDbBlockAction | T14 | | array action |
| AcDbBlockFlipAction | | AcDbBlockAction | T15 | | flip action |
| AcDbBlockLookupAction | | AcDbBlockAction | T16 | | lookup action |
| AcDbBlockMoveAction | | AcDbBlockAction | T17 | TT3 | move action |
| AcDbBlockPolarStretchAction | | AcDbBlockAction | T18 | TT4 | polar stretch action |

FIG. 14

| Class | ID | Description |
|---|---|---|
| AcDbBlockRotateAction | T19 | rotate action |
| AcDbBlockScaleAction | T20 | scale action |
| AcDbBlockStretchAction | T21 | stretch action |
| AcDbBlockAlignmentGrip | T22 | grip for alignment |
| AcDbBlockFlipGrip | T23 | grip for flip |
| AcDbBlockLinearGrip | T24 | linear grip |
| AcDbImpBlockLinearGrip | T25 | single point parameter |
| AcDbBlock1PtParameter | T26 | 2 point parameter |
| AcDbBlock2PtParameter | T27 | parameter for lookup action |
| AcDbBlockLookupParameter | T28 | |
| AcDbBlockBasepointParameter | T29 | |
| AcDbBlockPointParameter | T30 | |
| AcDbBlockVisibilityParameter | T31 | |
| AcDbBlockXYParameter | T32 | |
| AcDbBlockAlignmentParameter | T33 | |
| AcDbBlockFlipParameter | T34 | |
| AcDbBlockLinearParameter | T35 | |
| AcDbBlockPolarParameter | T36 | |
| AcDbBlockRotationParameter | T37 | |
| AcDbBlockElementEntity | T38 | the base class for all element entities |
| AcDbBlockActionEntity | T39 | |
| AcDbBlockGripEntity | T40 | |
| AcDbBlockParameterEntity | T41 | |
| AcDbBlock1PtParameterEntity | T42 | |
| AcDbBlock2PtParameterEntity | T43 | |
| AcDbBlockLookupParameterEntity | T44 | |
| AcDbBlockPointParameterEntity | T45 | |
| AcDbBlockVisibilityParameterEntity | T46 | |
| AcDbBlockXYParameterEntity | T47 | |
| AcDbBlockFlipParameterEntity | T48 | |
| AcDbBlockLinearParameterEntity | T49 | |
| AcDbBlockPolarParameterEntity | T50 | |
| AcDbBlockRotationParameterEntity | | |

| Class | ID | Description |
|---|---|---|
| AcDbBlockActionWithBasePt | TT5 | |
| AcDbBlockActionWithBasePt | TT6 | |
| AcDbBlockAction | TT7 | |
| AcDbBlockGrip | TT8 | |
| AcDbBlockGrip | TT9 | |
| AcDbBlockGrip | TT10 | |
| AcDbBlockParameter | TT11 | |
| AcDbBlockParameter | | |
| AcDbBlock1PtParameter | | |
| AcDbBlock1PtParameter | | |
| AcDbBlock1PtParameter | TT12 | |
| AcDbBlock1PtParameter | | |
| AcDbBlock2PtParameter | | |
| AcDbBlock2PtParameter | TT13 | |
| AcDbBlock2PtParameter | TT14 | |
| AcDbBlock2PtParameter | | |
| AcDbBlock2PtParameter | | |
| AcDbBlock2PtParameter | | |

FIG. 14(cont.)

| T1 | name | type | description |
|---|---|---|---|
| AcDbBlockRepresentation | AcDbRepData | AcDbXRecord | |
| | AppDataCache | AcDbDictionary | |

| T2 | name | type | description |
|---|---|---|---|
| AcDbRepData | ACDB_BLOCKREPRESENTATION_DATA_VERSION | Int16 | version |
| | mBlockId | AcDbHardPointerId | a hard pointer to the dynamic block's representation data |

| T3 | name | type | description |
|---|---|---|---|
| AppDataCache | ACAD_ENHANCEDBLOCKDATA | AcDbDictionary | |
| | ACAD_ENHANCEDBLOCKHISTORY | AcDbXRecord | |
| | ACAD_ENHANCEDBLOCKHDATA | AcDbDictionary | |

| T4 | name | type | description |
|---|---|---|---|
| ACAD_ENHANCEDBLOCKDATA | Graph Node ID | AcDbXRecord | |

| T5 | name | type | description |
|---|---|---|---|
| Graph Node ID | | | the value of the Graph Node ID serves as the key into the ACAD_ENHANCEDBLOCKDATA dictionary for storing specific per instance data for the block reference. If an element at a given Graph Node ID has per instance data to save, the details of that storage are elaborated in the description of that object If an element does not have per instance data, a Graph Node ID/data pair is not created. |

| T6 | name | type | description |
|---|---|---|---|
| ACAD_ENHANCEDBLOCKHISTORY | kHistoryRecordCurrentVersion | AcDb::kDxfXdInteger16 | |
| | nodeId | AcDb::kDxfXdInteger32 | |
| | property name | AcDb::DxfXTextString | |
| | property value | struct resbuf | the new value for the specified node property, held in an AcDbEvalVariant object |

FIG. 14(cont.)

| T7 | name | type | description |
|---|---|---|---|
| ACAD_ENHANCEDBLOCKDATA | Graph Node ID | AcDbXRecord | |

| T8 | name | type | description |
|---|---|---|---|
| AcDbEvalExpr | version marker | Adesk::UInt32 | the value ~0, indicates to the filer that the version of this object follows |
| | major version number | Adesk::UInt32 | |
| | maintenance release version | Adesk::UInt32 | |
| | value | AcDbXRecord | particular value associated with this node |
| | node id | unsigned long | the graph node id for this node |

| T9 | name | type | description |
|---|---|---|---|
| AcDbBlockElement | element name | AcDbXRecord | the localized name of the element |
| | major version number | Adesk::UInt32 | |
| | maintenance release version | Adesk::UInt32 | |
| | alert state | Adesk::UInt32 | |

| T10 | name | type | description |
|---|---|---|---|
| AcDbBlockAction | m_ptDisplayLocation | AsGePoint3d | location where the graphics for the action are displayed in the dynamic block editor |
| | number of selections | Adesk::UInt32 | the number of things acted on by the action |
| | soft IDs of selections | AcDbSoftPointerId | one soft pointer to each selection |
| | number of dependent authoring elements | Adesk::UInt32 | number of dependent nodes in the graph |
| | node IDs of dependent authoring elements | AcDbEvalNodeId | node ID of dependent elements |

| T11 | name | type | description |
|---|---|---|---|
| AcDbBlockGrip | node id X | AcDbEvalNodeId | id of the node containing the X display location for the grip |
| | node id Y | AcDbEvalNodeId | id of the node containing the Y display location for the grip |
| | display location | AcGePoint3d | geometric location of the grip |
| | insertion cycling | bool | true/false indicating the state of insertion cycling |
| | insertion cycling weight | Adesk::UInt32 | |

FIG. 14(cont.)

T12
AcDbBlockParameter

| name | type | description |
|---|---|---|
| m_bShowProperties | bool | true/false indicating whether to show properties |
| m_bChainActions | bool | true/false indicating whether to chain actions |

T13
AcDbBlockActionWithBasePt

| name | type | description |
|---|---|---|
| m_ptBasePoint | AcGePoint3d | |
| m_nodeidBaseXDependency | AcDbEvalNodeId | |
| m_strBaseXDependency | AcString | |
| m_nodeidBaseYDependency | AcDbEvalNodeId | |
| m_strBaseYDependency | AcString | |
| m_bDependent | bool | |
| m_ptBasePointOffset | AcGeVector3d | |

T14
AcDbBlockArrayAction

| name | type | description |
|---|---|---|
| m_nodeidBaseDependency | AcDbEvalNodeId | |
| m_strBaseDependency | AcString | |
| m_nodeidEndDependency | AcDbEvalNodeId | |
| m_strEndDependency | AcString | |
| m_nodeidUpdatedBaseDependency | AcDbEvalNodeId | |
| m_strUpdatedBaseDependency | AcString | |
| m_nodeidUpdatedEndDependency | AcDbEvalNodeId | |
| m_strUpdatedEndDependency | AcString | |
| m_dRowOffset | double | |
| m_dColumnOffset | double | |

T15
AcDbBlockFlipAction

| name | type | description |
|---|---|---|
| m_nodeidFlipStateDependency | AcDbEvalNodeId | |
| m_strFlipStateDependency | AcString | |
| m_nodeidUpdatedFlipStateDependency | AcDbEvalNodeId | |
| m_strUpdatedFlipStateDependency | AcString | |
| m_nodeidBaseDependency | AcDbEvalNodeId | |
| m_strBaseDependency | AcString | |
| m_nodeidEndDependency | AcDbEvalNodeId | |
| m_strEndDependency | AcString | |

AcDbBlockLookupAction

| name | type | description |
|---|---|---|
| mnRows | Adesk::UInt32 | number of rows in the lookup table |
| mnCols | Adesk::UInt32 | number of columns in the lookup table |
| mTable | AcString | a string for each cell, rows X columns |

(for each column)

| name | type | description |
|---|---|---|
| mConnectableId | AcDbEvalNodeId | |
| meType | Adesk::UInt32 | |
| meUnits | Adesk::UInt32 | |
| mbIsOutputColumn | bool | |
| msUnmatchedValue | AcString | |
| mbIsInvertible | bool | |
| msConnectionName | AcString | |

T17

AcDbBlockMoveAction

| name | type | description |
|---|---|---|
| m_nodeidDeltaXDependency | AcDbEvalNodeId | |
| m_strDeltaXDependency | AcString | |
| m_nodeidDeltaYDependency | AcDbEvalNodeId | |
| m_strDeltaYDependency | AcString | |
| m_dDistanceMultiplier | double | |
| m_dOffsetAngle | double | |
| m_eXYType | Adesk::UInt8 | |

T18

AcDbBlockPolarStretchAction

| name | type | description |
|---|---|---|
| m_nodeidDeltaXDependency | AcDbEvalNodeId | |
| m_strDeltaXDependency | AcString | |
| m_nodeidDeltaYDependency | AcDbEvalNodeId | |
| m_strDeltaYDependency | AcString | |
| m_nodeidBaseDependency | AcDbEvalNodeId | |
| m_strBaseDependency | AcString | |
| m_nodeidEndDependency | AcDbEvalNodeId | |
| m_strEndDependency | AcString | |
| m_nodeidUpdatedBaseDependency | AcDbEvalNodeId | |
| m_strUpdatedBaseDependency | AcString | |
| m_nodeidUpdatedEndDependency | AcDbEvalNodeId | |

| name | type | description |
|---|---|---|
| m_strUpdatedEndDependency | AcString | |
| stretch frame count | Adesk::UInt32 | number of elements in the stretch frame |
| m_arrayStretchFrame[] elements | AcGePoint2d | stretch frame count elements |
| | | |
| *stretch point map* | | |
| *please note: these are nested arrays* | | |
| rotate only selection count | Adesk::UInt32 | number of elements in the rotate only selection set |
| m_selsetRotateObjy[] elements | AcDbSoftPointerId | ids of the rotate only selection set |
| stretch point map count | Adesk::UInt32 | number of id/map array sets to follow |
| stretchPtsMap[] elements | AcDbSoftPointerId | id |
| number of elements in the map array | Adesk::UInt32 | number of map elements to follow |
| map element | Adesk::UInt32 | |
| ... | ... | |
| *element stretch points map* | | |
| *please note: these are nested arrays* | | |
| stretch point map count | Adesk::UInt32 | number of elements/maps in the stretch frame |
| element id | AcDbEvalNodeId | |
| number of elements in the map array | Adesk::UInt32 | number of map elements to follow |
| map element | Adesk::UInt32 | |
| ... | | |
| m_dDistanceMultiplier | double | |
| m_dOffsetAngle | double | |
| m_nodeidarrayRotateOnlyDependents.length() | Adesk::UInt32 | number of elements in this array |
| m_nodeidarrayRotateOnlyDependents[] | AcDbEvalNodeId | dependent authoring element node ids |

T19
AcDbBlockRotateAction

| name | type | description |
|---|---|---|
| m_nodeidDeltaRotDependency | AcDbEvalNodeId | |
| m_strDeltaRotDependency | AcString | |

T20
AcDbBlockScaleAction

| name | type | description |
|---|---|---|
| m_nodeidScaleXYDependency | AcDbEvalNodeId | |
| m_strScaleXYDependency | AcString | |
| m_nodeidScaleXDependency | AcDbEvalNodeId | |
| m_strScaleXDependency | AcString | |
| m_nodeidScaleYDependency | AcDbEvalNodeId | |
| m_strScaleYDependency | AcString | |
| m_eXYType | Adesk::UInt8 | |

FIG. 14(cont.)

| T21 | name | type | description |
|---|---|---|---|
| AcDbBlockStretchAction | m_nodeidDeltaXDependency<br>m_strDeltaXDependency<br>m_nodeidDeltaYDependency<br>m_strDeltaYDependency | AcDbEvalNodeId<br>AcString<br>AcDbEvalNodeId<br>AcString | |

| T22 | name | type | description |
|---|---|---|---|
| AcDbBlockAlignmentGrip | m_gripOrientation | AcGeVector3d | |

| T23 | name | type | description |
|---|---|---|---|
| AcDbBlockFlipGrip | m_nodeidFlip<br>m_gripOrientation | AcDbEvalNodeId<br>AcGeVector3d | |

| T24 | name | type | description |
|---|---|---|---|
| AcDbImpBlockLinearGrip | m_gripOrientation | AcGeVector3d | |

| T25 | name | type | description |
|---|---|---|---|
| AcDbBlock1PtParameter | m_ptDefinitionPoint | AcGePoint3d | |
| | m_mapUpdatedXConnections.size()<br>first element of first pair<br>second element of first pair | Adesk::UInt8<br>AcDbEvalNodeId<br>AcString | number of elements in this property connection. A property connection is a map of pairs. The pairs consist of an AcDbEvalNodeId and an AcString. |
| | | | (repeated "size" times) |
| | m_mapUpdatedYConnections.size()<br>first element of first pair<br>second element of first pair | Adesk::UInt8<br>AcDbEvalNodeId<br>AcString | number of elements in this property connection. A property connection is a map of pairs. The pairs consist of an AcDbEvalNodeId and an AcString. |
| | ... | | (repeated "size" times) |
| | m_gripNodeId | AcDbEvalNodeId | id of this parameter's grip |

| T26 | | |
|---|---|---|
| AcDbBlock2PtParameter: | | |
| name | type | description |
| m_ptDefinitionBasePoint | AcGePoint3d | |
| m_ptDefinitionEndPoint | AcGePoint3d | |
| m_mapUpdatedBaseXConnections.size() | Adesk::UInt8 | number of elements in this property connection. A property connection is a map of pairs. The pairs consist of an AcDbEvalNodeId and an AcString. |
| first element of first pair | AcDbEvalNodeId | |
| second element of first pair | AcString | |
| ... | | (repeated "size" times) |
| m_mapUpdatedBaseYConnections.size() | Adesk::UInt8 | number of elements in this property connection. A property connection is a map of pairs. The pairs consist of an AcDbEvalNodeId and an AcString. |
| first element of first pair | AcDbEvalNodeId | |
| second element of first pair | AcString | |
| ... | | (repeated "size" times) |
| m_mapUpdatedEndXConnections.size() | Adesk::UInt8 | number of elements in this property connection. A property connection is a map of pairs. The pairs consist of an AcDbEvalNodeId and an AcString. |
| first element of first pair | AcDbEvalNodeId | |
| second element of first pair | AcString | |
| ... | | (repeated "size" times) |
| m_mapUpdatedEndYConnections.size() | Adesk::UInt8 | number of elements in this property connection. A property connection is a map of pairs. The pairs consist of an AcDbEvalNodeId and an AcString. |
| first element of first pair | AcDbEvalNodeId | |
| second element of first pair | AcString | |
| ... | | (repeated "size" times) |
| m_arrayGripNodeIds[0] | AcDbEvalNodeId | node ids of the 4 grips for this parameter |
| m_arrayGripNodeIds[1] | AcDbEvalNodeId | |
| m_arrayGripNodeIds[2] | AcDbEvalNodeId | |
| m_arrayGripNodeIds[3] | AcDbEvalNodeId | |
| m_nBaseLocation | Adesk::Int16 | flags informing how to interpret the base location |

FIG. 14(cont.)

| T27 | | | |
|---|---|---|---|
| AcDbBlockLookupParameter | name | type | description |
| | m_LookupActionId | AcDbEvalNodeId | |
| | m_strLookupName | AcString | |
| | m_strLookupDescription | AcString | |

| T28 | | | |
|---|---|---|---|
| AcDbBlockBasePointParameter | name | type | description |
| | m_ptPoint | AcGePoint3d | |
| | m_ptUpdatedPoint | AcGePoint3d | |

| T29 | | | |
|---|---|---|---|
| AcDbBlockPointParameter | name | type | description |
| | m_strPositionName | AcString | |
| | m_strPositionDescription | AcString | |
| | m_ptLabelPoint | AcGePoint3d | |

| T30 | | | |
|---|---|---|---|
| AcDbBlockVisibilityParameter | name | type | description |
| | m_bInitializedByManager | bool | |
| | m_strVisibilityName | AcString | |
| | m_strVisibilityDescription | AcString | |
| | m_CurrentVisibilitySet | Adesk::Int32 | |
| | m_EntityList.length() | Adesk::Int32 | number of entity ids to follow |
| | m_EntityList[] | AcDbSoftPointerId | |
| | m_VisibilitySets.length() | Adesk::Int32 | number of visibility sets to follow |
| for each visibility set | m_name | AcString | |
| ... | m_entityList.length() | Adesk::Int32 | number of entity ids to follow |
| ... | m_entityList[] | AcDbSoftPointerId | |
| ... | m_elementList.length() | Adesk::Int32 | number of element ids to follow |
| | m_elementList[] | AcDbSoftPointerId | |

AcDbBlockXYParameter

| name | type | description |
|---|---|---|
| m_strVertName | AcString | |
| m_strHorzName | AcString | |
| m_strVertDescription | AcString | |
| m_strHorzDescription | AcString | |
| mdXDisposition | double | |
| mdYDisposition | double | |
| xValueSet.mnOptions | Adesk::UInt32 | |
| xValueSet.mdMin | double | |
| xValueSet.mdMax | double | |
| xValueSet.mdIncrement | double | |
| xValueSet.mValues.length() | UInt16 | number of values to follow |
| xValueSet.mValues[] | double | |
| yValueSet.mnOptions | Adesk::UInt32 | |
| yValueSet.mdMin | double | |
| yValueSet.mdMax | double | |
| yValueSet.mdIncrement | double | |
| yValueSet.mValues.length() | UInt16 | number of values to follow |
| yValueSet.mValues[] | double | |

T32

AcDbBlockAlignmentParameter

| name | type | description |
|---|---|---|
| alignPerpendicular | bool | |

T33

AcDbBlockFlipParameter

| name | type | description |
|---|---|---|
| m_strFlipLabel | AcString | |
| m_strFlipDescription | AcString | |
| m_strBaseStateLabel | AcString | |
| m_strFlippedStateLabel | AcString | |
| m_ptLabelPoint | AcGePoint3d | |
| m_nodeIdFlipStateDependency | AcDbEvalNodeId | |
| m_strFlipStateDependency | AcString | |

FIG. 14(cont.)

| T34 | | | |
|---|---|---|---|
| AcDbBlockLinearParameter | | | |
| | name | type | description |
| | m_strDistanceName | AcString | |
| | m_strDistanceDescription | AcString | |
| | m_dOffset | AcString | |
| | m_ValueSet.mnOptions | Adesk::UInt32 | |
| | m_ValueSet.mdMin | double | |
| | m_ValueSet.mdMax | double | |
| | m_ValueSet.mdIncrement | double | |
| | m_ValueSet.mValues.length() | UInt16 | number of values to follow |
| | m_ValueSet.mValues[] | double | |

| T35 | | | |
|---|---|---|---|
| AcDbBlockPolarParameter | | | |
| | name | type | description |
| | m_strDistanceName | AcString | |
| | m_strDistanceDescription | AcString | |
| | m_strAngleName | AcString | |
| | m_strAngleDescription | AcString | |
| | distanceValueSet().mnOptions | Adesk::UInt32 | |
| | distanceValueSet().mdMin | double | |
| | distanceValueSet().mdMax | double | |
| | distanceValueSet().mdIncrement | double | |
| | distanceValueSet().mValues.length() | UInt16 | number of values to follow |
| | distanceValueSet().mValues[] | double | |
| | angleValueSet().mnOptions | Adesk::UInt32 | |
| | angleValueSet().mdMin | double | |
| | angleValueSet().mdMax | double | |
| | angleValueSet().mdIncrement | double | |
| | angleValueSet().mValues.length() | UInt16 | number of values to follow |
| | angleValueSet().mValues[] | double | |

| T36 | | | |
|---|---|---|---|
| AcDbBlockRotationParameter | | | |
| | name | type | description |
| | m_ptDefinitionBaseAnglePoint | AcGePoint3d | |
| | m_strAngleName | AcString | |
| | m_strAngleDescription | AcString | |
| | m_dOffset | double | |

FIG. 14(cont.)

| | name | type | description |
|---|---|---|---|
| T37 AcDbBlockElementEntity | valueSet().mnOptions<br>valueSet().mdMin<br>valueSet().mdMax<br>valueSet().mdIncrement<br>valueSet().mValues.length()<br>valueSet.mValues[] | Adesk::UInt32<br>double<br>double<br>double<br>UInt16<br>double | number of values to follow |
| T38 AcDbBlockActionEntity | msName<br>msAlertOn | AcString<br>bool | |
| | name | type | description |
| T39 AcDbBlockGripEntity | m_ptDisplayLocation | AcGePoint3d | |
| | name | type | description |
| T40 AcDbBlockParameterEntity | displayLocation()<br>insertionCycling()<br>insertionCyclingWeight() | AcGePoint3d<br>bool<br>Adesk::UInt32 | |
| | name | type | description |
| T41 AcDbBlock1PtParameterEntity | m_bShowProperties | bool | |
| | name | type | description |
| T42 AcDbBlock2PtParameterEntity | m_ptDefinitionPoint | AcGePoint3d | |
| | name | type | description |
| T43 AcDbBlockLookupParameterEntity | m_ptDefinitionBasePoint<br>m_ptDefinitionEndPoint | AcGePoint3d<br>AcGePoint3d | |
| | name | type | description |
| | m_strLookupName<br>m_strLookupDescription | AcString<br>AcString | |

T44
AcDbBlockPointParameterEntity

| name | type | description |
|---|---|---|
| m_strPositionName | AcString | |
| m_strPositionDescription | AcString | |
| m_ptLabelPoint | AcGePoint3d | |

T45
AcDbBlockVisibilityParameterEntity

| name | type | description |
|---|---|---|
| m_strVisibilityName | AcString | |
| m_strVisibilityDescription | AcString | |

T46
AcDbBlockXYParameterEntity

| name | type | description |
|---|---|---|
| m_strVertName | AcString | |
| m_strHorzName | AcString | |
| m_strVertDescription | AcString | |
| m_strHorzDescription | AcString | |
| mdXDisposition | double | |
| mdYDisposition | double | |
| xValueSet.mnOptions | Adesk::UInt32 | |
| xValueSet.mdMin | double | |
| xValueSet.mdMax | double | |
| xValueSet.mdIncrement | double | |
| xValueSet.mxValues.length() | UInt16 | number of values to follow |
| xValueSet.mxValues[] | double | |
| yValueSet.mnOptions | Adesk::UInt32 | |
| yValueSet.mdMin | double | |
| yValueSet.mdMax | double | |
| yValueSet.mdIncrement | double | |
| yValueSet.myValues.length() | UInt16 | number of values to follow |
| yValueSet.myValues[] | double | |

T47

AcDbBlockFlipParameterEntity

| name | type | description |
|---|---|---|
| m_strFlipLabel | AcString | |
| m_strFlipDescription | AcString | |
| m_strBaseStateLabel | AcString | |
| m_strFlippedStateLabel | AcString | |
| m_ptLabelPoint | AcGePoint3d | |

T48

AcDbBlockLinearParameterEntity

| name | type | description |
|---|---|---|
| m_strDistanceName | AcString | |
| m_strDistanceDescription | AcString | |
| m_dOffset | double | |
| ValueSet().mnOptions | Adesk::UInt32 | |
| ValueSet().mdMin | double | |
| ValueSet().mdMax | double | |
| ValueSet().mdIncrement | double | |
| ValueSet().mValues.length() | UInt16 | number of values to follow |
| ValueSet().mValues[] | double | |

T49

AcDbBlockPolarParameterEntity

| name | type | description |
|---|---|---|
| m_strDistanceName | AcString | |
| m_strDistanceDescription | AcString | |
| m_strAngleName | AcString | |
| m_strAngleDescription | AcString | |
| m_dOffset | double | |
| distanceValueSet().mnOptions | Adesk::UInt32 | |
| distanceValueSet().mdMin | double | |
| distanceValueSet().mdMax | double | |
| distanceValueSet().mdIncrement | double | |
| distanceValueSet().mdistanceValues.length() | UInt16 | number of values to follow |
| distanceValueSet().mdistanceValues[] | double | |
| angleValueSet().mnOptions | Adesk::UInt32 | |
| angleValueSet().mdMin | double | |
| angleValueSet().mdMax | double | |

FIG. 14(cont.)

| name | type | description |
|---|---|---|
| angleValueSet().mdIncrement | double | |
| angleValueSet().mangleValues.length() | UInt16 | number of values to follow |
| angleValueSet().mangleValues[] | double | |

T50
AcDbBlockRotationParameterEntity

| name | type | description |
|---|---|---|
| m_strAngleName | AcString | |
| m_strAngleDescription | AcString | |
| m_dOffset | double | |
| m_ptDefinitionBaseAnglePoint | AcGePoint3d | |
| valueSet().mnOptions | Adesk::UInt32 | |
| valueSet().mdMin | double | |
| valueSet().mdMax | double | |
| valueSet().mdIncrement | double | |
| valueSet().mvalues.length() | UInt16 | number of values to follow |
| valueSet().mvalues[] | double | |

FIG. 14(cont.)

| | type key | value | description |
|---|---|---|---|
| TT1 | | | |
| AcDbBlockElement | | | The AcDbBlockElement "brands" each piece of per instance data generated by each derived class. This branding is accomplished by using a hash to encode the name of the derived class. This hash involves taking the integer value of each character in the name, multiplying it by an arbitrary constant real number, and adding the result to a running sum. Finally that running sum is truncated to an integer and stored as a key. |
| | AcDb::kDxfXdInteger32 | a | This is the "brand" key, as described above, generated by processing the name in left to right order. |
| | AcDb::kDxfXdInteger32 | b | This is the "brand" key, as described above, generated by processing the name in right to left order. |
| | AcDb::kDxfInt16 | AcDb::kDHL_CURRENT | major release version |
| | AcDb::kDxfInt16 | AcDb::kMReleaseCurrent | maintenance release version |
| TT2 | type key | value | description |
| AcDbBlockActionWithBasePt | | | |
| | AcDb::kDxfXCoord | mt_ptPoint | |
| TT3 | type key | value | description |
| AcDbBlockMoveAction | | | |
| | AcDb::kDxfReal | angleOffset() | |
| TT4 | type key | value | description |
| AcDbBlockPolarStretchAction | | | |
| | AcDb::kDxfReal | angleOffset() | |
| TT5 | type key | value | description |
| AcDbBlockStretchAction | | | |
| | AcDb::kDxfReal | angleOffset() | |
| TT6 | type key | value | description |
| AcDbBlockAlignmentGrip | | | |
| | AcDb::kDxfInt16 | mnInvertFlag | |
| TT7 | type key | value | description |
| AcDbBlockFlipGrip | | | |
| | AcDb::kDxfInt16 | mnInvertFlag | |
| | AcDb::kDxfInt16 | nFlipState | |

FIG. 14(cont.)

| | type key | value | description |
|---|---|---|---|
| TT8 | | | |
| AcDbBlock1PtParameter | AcDb::kDxfReal | angleOffset() | |
| TT9 | type key | value | description |
| AcDbBlock2PtParameter | AcDb::kDxfXCoord | m_ptBasePoint | |
| | AcDb::kDxfXCoord | m_ptEndPoint | |
| | AcDb::kDxfXCoord | m_vecNormal | |
| TT10 | type key | value | description |
| AcDbBlockLookupParameter | AcDb::kDxfText | m_strCurrentValue | |
| TT11 | type key | value | description |
| AcDbBlockVisibilityParameter | AcDb::kDxfText | m_VisibilitySets[m_CurrentVisibilitySet]->m_name | |
| TT12 | type key | value | description |
| AcDbBlockFlipParameter | AcDb::kDxfInt16 | m_nFlipState | |
| TT13 | type key | value | description |
| AcDbBlockPolarParameter | AcDb::kDxfXCoord | m_ptBaseAnglePoint | |
| TT14 | type key | value | description |
| AcDbBlockRotationParameter | AcDb::kDxfXCoord | m_ptBaseAnglePoint | |

FIG. 14(cont.)

LOOK-UP TABLE ACTION

CROSS REFERENCE TO RELATED APPLICATION

This application claims priority to pending U.S. Provisional Application Ser. No. 60/740,524 entitled "Dynamic Blocks", filed on Nov. 28, 2005, the entire contents of which is hereby incorporated by reference.

BACKGROUND

This disclosure relates to data structures and methods for processing and storing formatted data.

Computer-aided design (CAD) software applications have been available for many years to assist in preparing two dimensional and three dimensional drawings and models. AutoCAD® software available from Autodesk, Inc. of San Rafael, Calif. is an example of a widely used CAD software application. A software application may allow a user to create an object including one more entities, sometimes referred to as a block, where the block can be identically replicated throughout the drawing or model. This saves the user time in having to redraw an identical object more than one time.

SUMMARY

This disclosure generally describes data structures and methods for processing and storing data. In general, in one aspect, the invention features a method and a computer program product (encoded on a computer-readable medium) operable to cause data processing apparatus to perform operations as described below. The data processing apparatus identifies a first block. The first block represents a two or three dimensional object in a Computer Aided Design (CAD) model. The first block has a visual presentation in a presentation of the CAD model based on a first plurality of property values denoted by a first label in a plurality of labels. The data processing apparatus receives user input specifying a new value for first property value in the first plurality of property values. The data processing apparatus selects a second plurality of property values denoted by a second label. The second plurality of property values differs by at least one value from the first plurality of property values. The second plurality of property values has a second property value that is satisfied by the new value. The data processing apparatus updates the visual presentation of the first block based on the second plurality of property values.

Implementations of the invention may include one or more of the following. The updating includes changing a shape or appearance of the first block.

The data processing apparatus receives user input changing the second label to a third label. The third label is in the plurality of labels. The third label denotes a third plurality of property values differing by at least one value from the second plurality of property values and the first plurality of property values. The data processing apparatus updates the visual presentation of the first block based on the third plurality of property values.

A property value is a single value or a range of values. The first property value specifies a physical size of the first block. The size property value includes parameters. The parameters are associated with more than two dimensions. The first plurality of property values includes a visibility property value. The visibility property value indicating if at least a portion of the first block is visible in the presentation of the first block.

The first property value is associated with a two-way constraint with a property value of a second block. The two-way constraint is a requirement that a change to the first property value affects the property value of the second block, and vice versa.

The first property value is associated with a one-way constraint with a property value of a second block. The one-way constraint is a requirement that a change to the first property value affects the property value of the second block.

The invention may include one or more of the following advantages. Previously, users of CAD software applications may have created many blocks that differed in only very small ways, such as, for example, creating five different bed blocks, one for each of the standard bed sizes. Instead, a look-up table that associates a block with multiple different parameters and attributes can be used so that a user now may create a single block to do the job of the multiple blocks the user previously created. For example, the same user may have a single bed block that is associated with a look-up table that allows the bed block to be associated with the five different bed types.

DRAWINGS

Figure 4A:
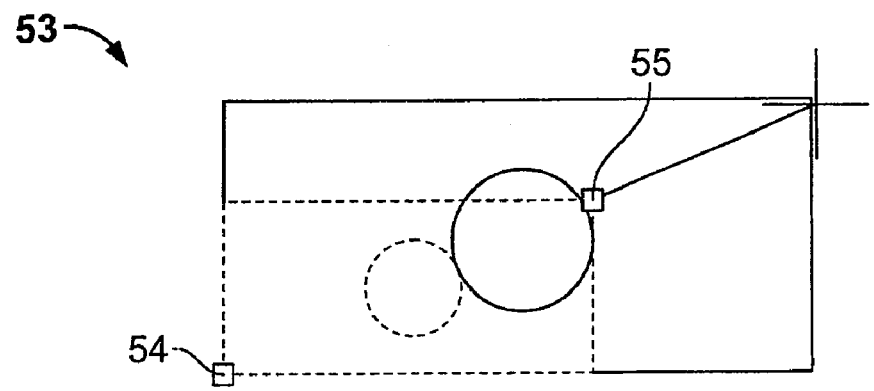
Figure 4B:
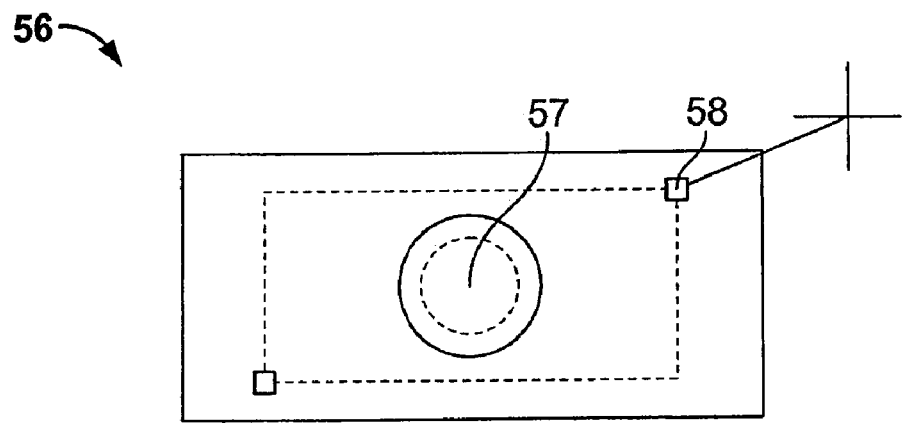

FIGS. 4A-B show an exemplary dynamic block illustrating a scale action.

Figure 5A:
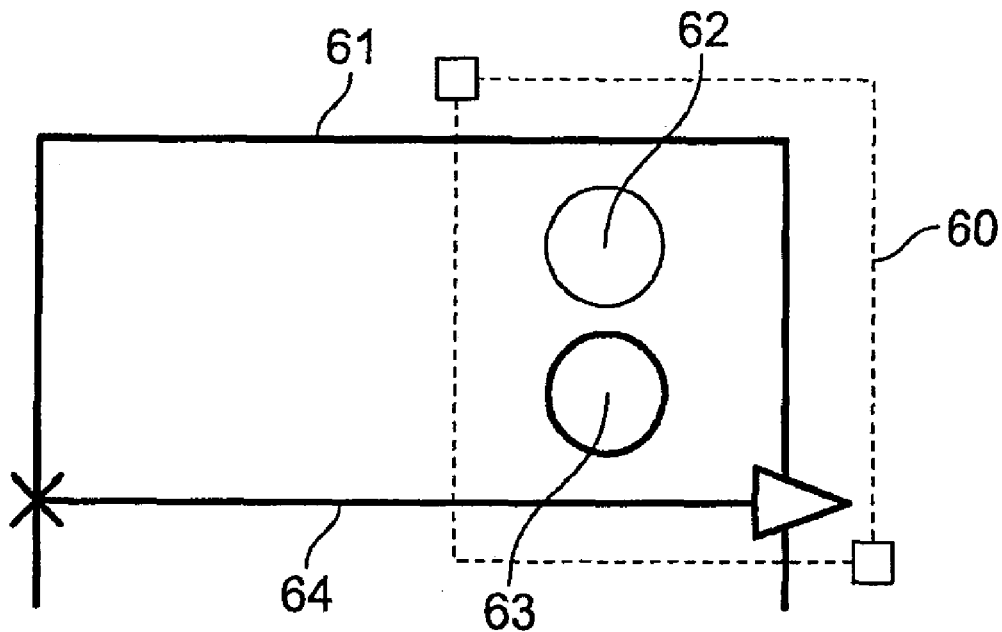
Figure 5B:
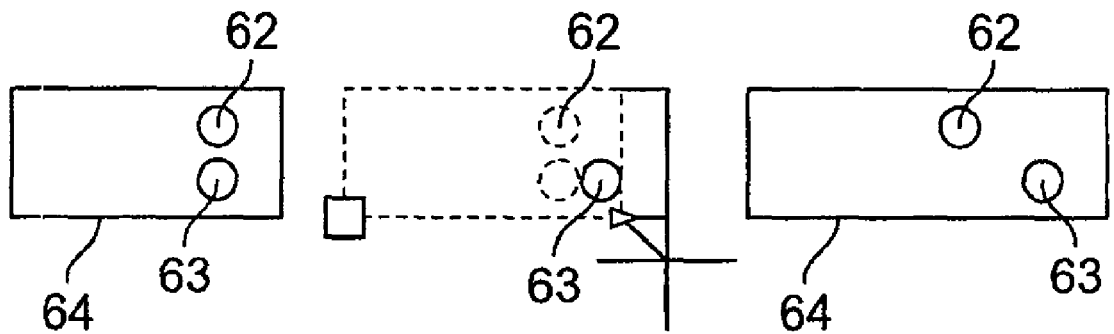

FIGS. 5A-B show an exemplary dynamic block illustrating a stretch action.

Figure 6A:
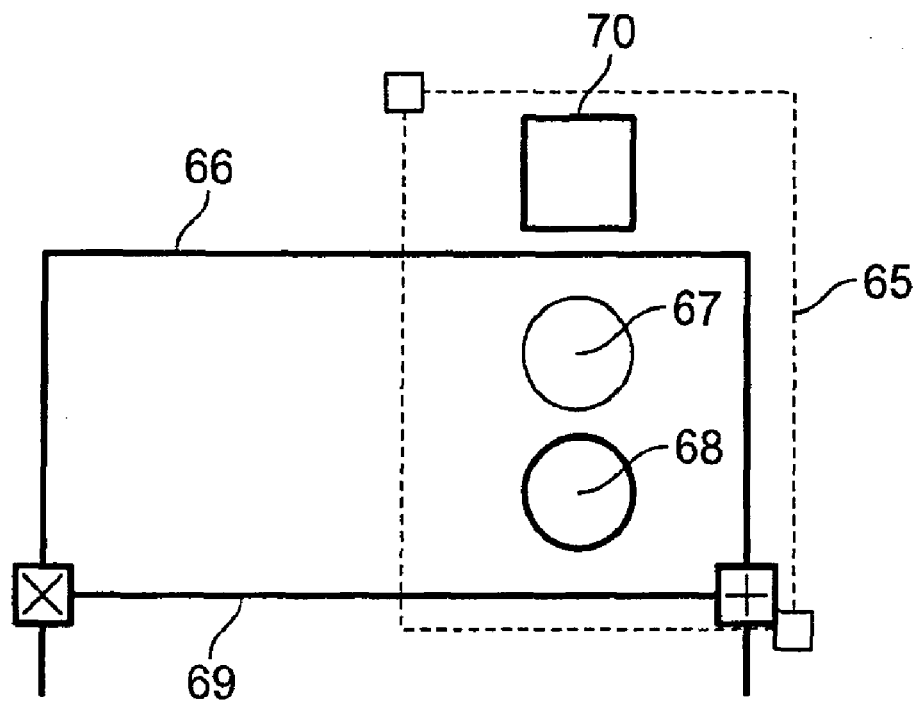
Figure 6B:
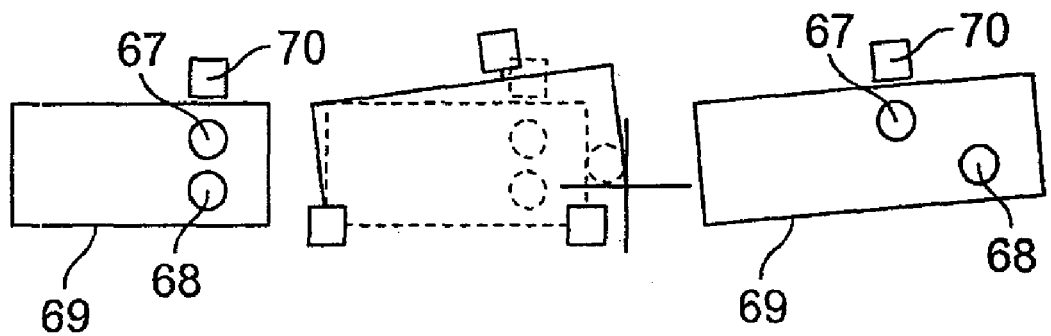

FIGS. 6A-B show an exemplary dynamic block illustrating a polar action.

Figure 7A:
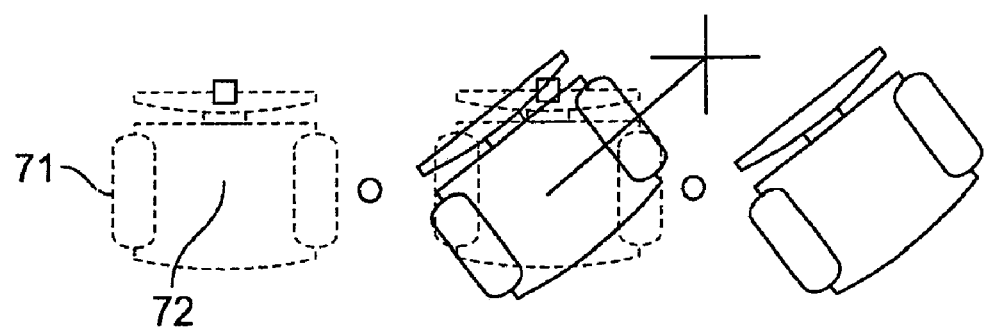
Figure 7B:
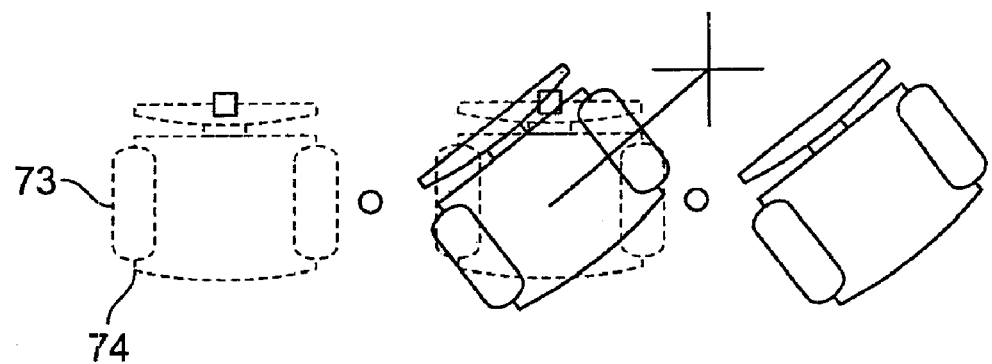
Figure 7C:
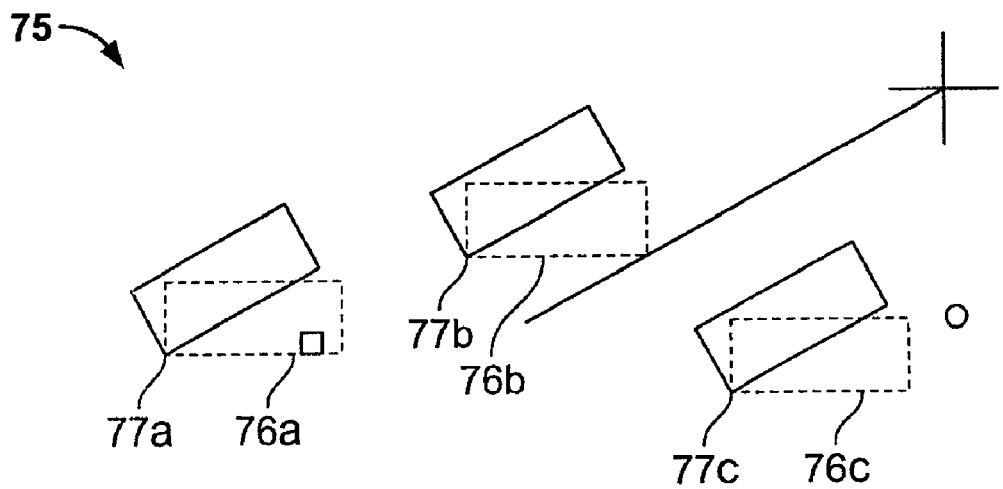

FIGS. 7A-C show exemplary dynamic blocks illustrating a rotate action.

Figure 8:
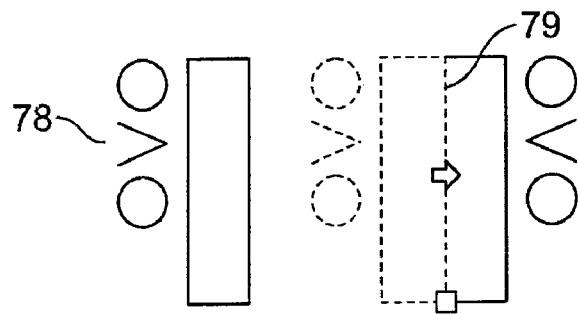
Figure 9A:
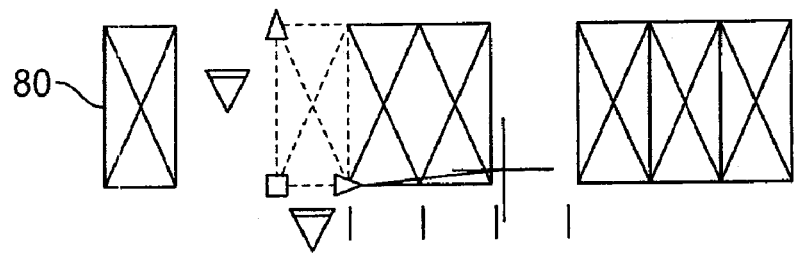
Figure 9B:
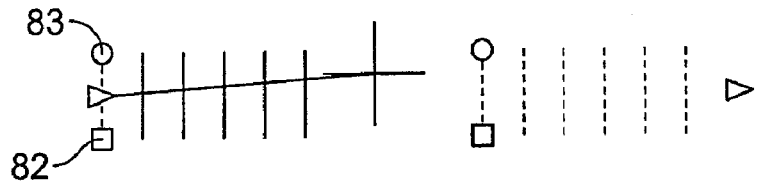
Figure 9C:
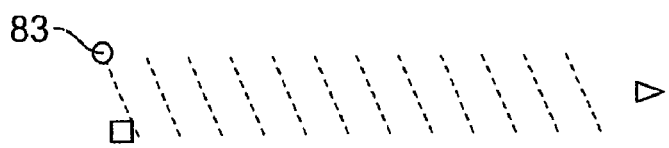
Figure 9D:
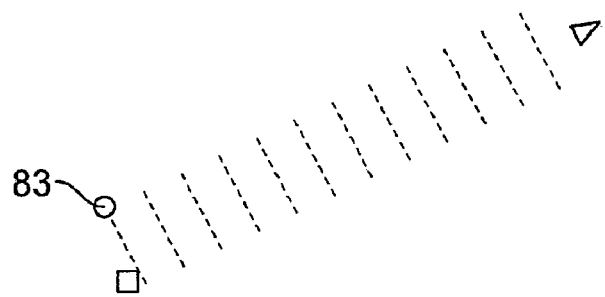

FIG. 8 shows an exemplary dynamic block illustrating a flip action.

FIGS. 9A-D show exemplary dynamic blocks illustrating an array action.

Figure 10A:
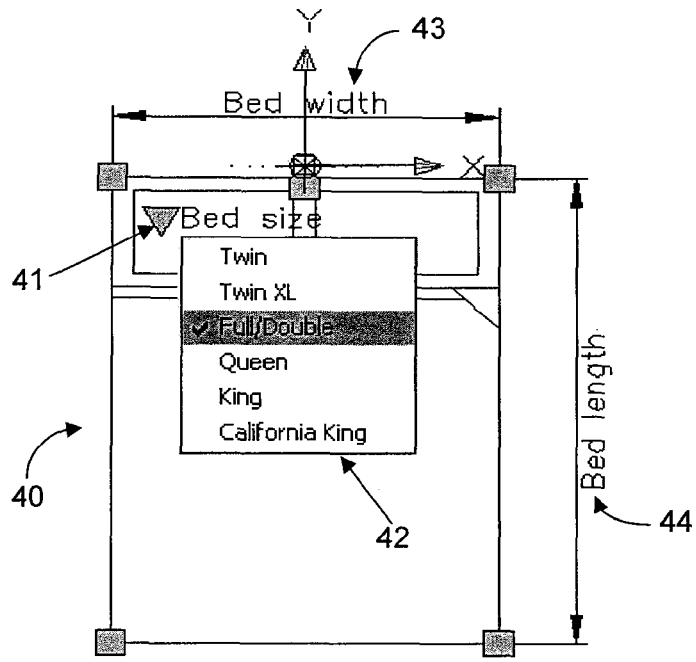

FIG. 10A shows an exemplary dynamic block illustrating a look-up grip for a block property.

Figure 10B:
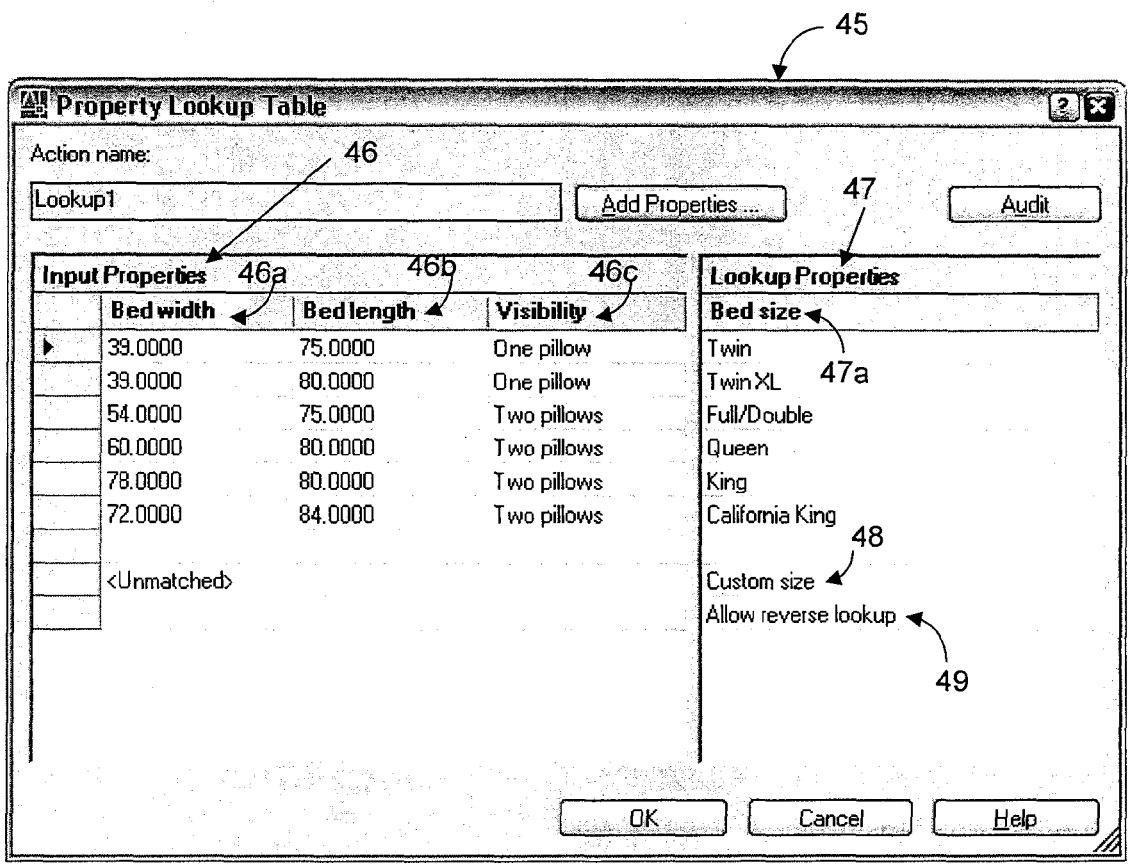

FIG. 10B shows an exemplary block property look-up table.

Figure 10C:
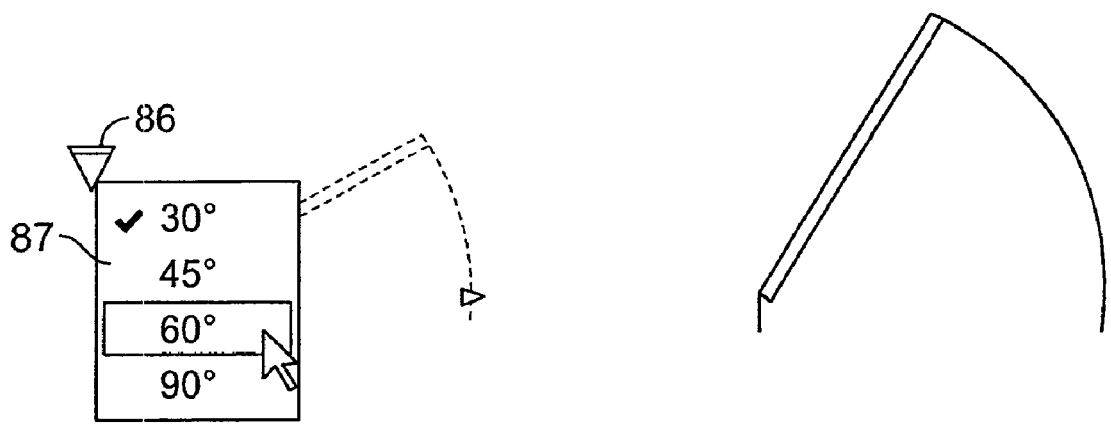

FIG. 10C shows an exemplary dynamic block illustrating a look-up grip for a visibility state.

FIGS. 11A-D show exemplary dynamic blocks illustrating visibility states.

Figure 12A:
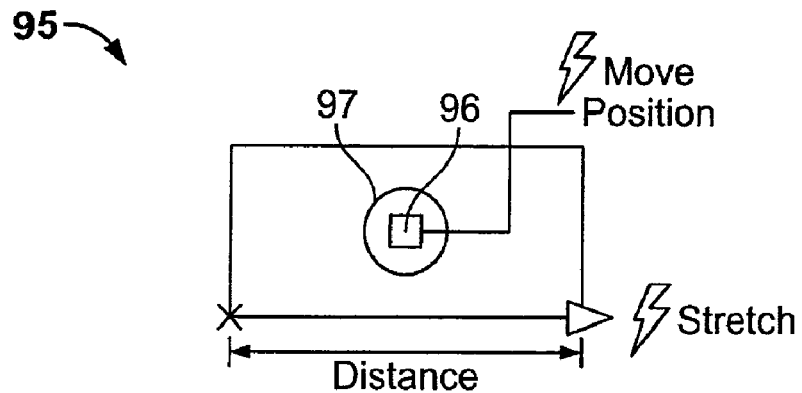
Figure 12B:
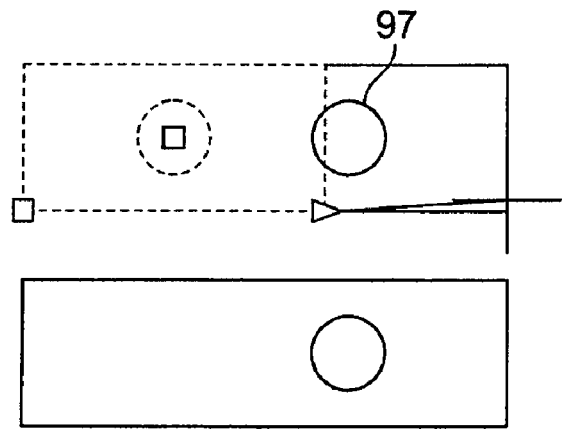
Figure 12C:
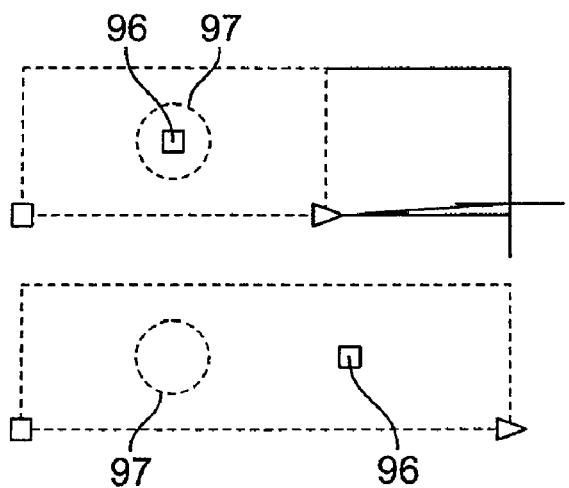

FIGS. 12A-C show exemplary dynamic blocks illustrating chained actions.

Figure 13:
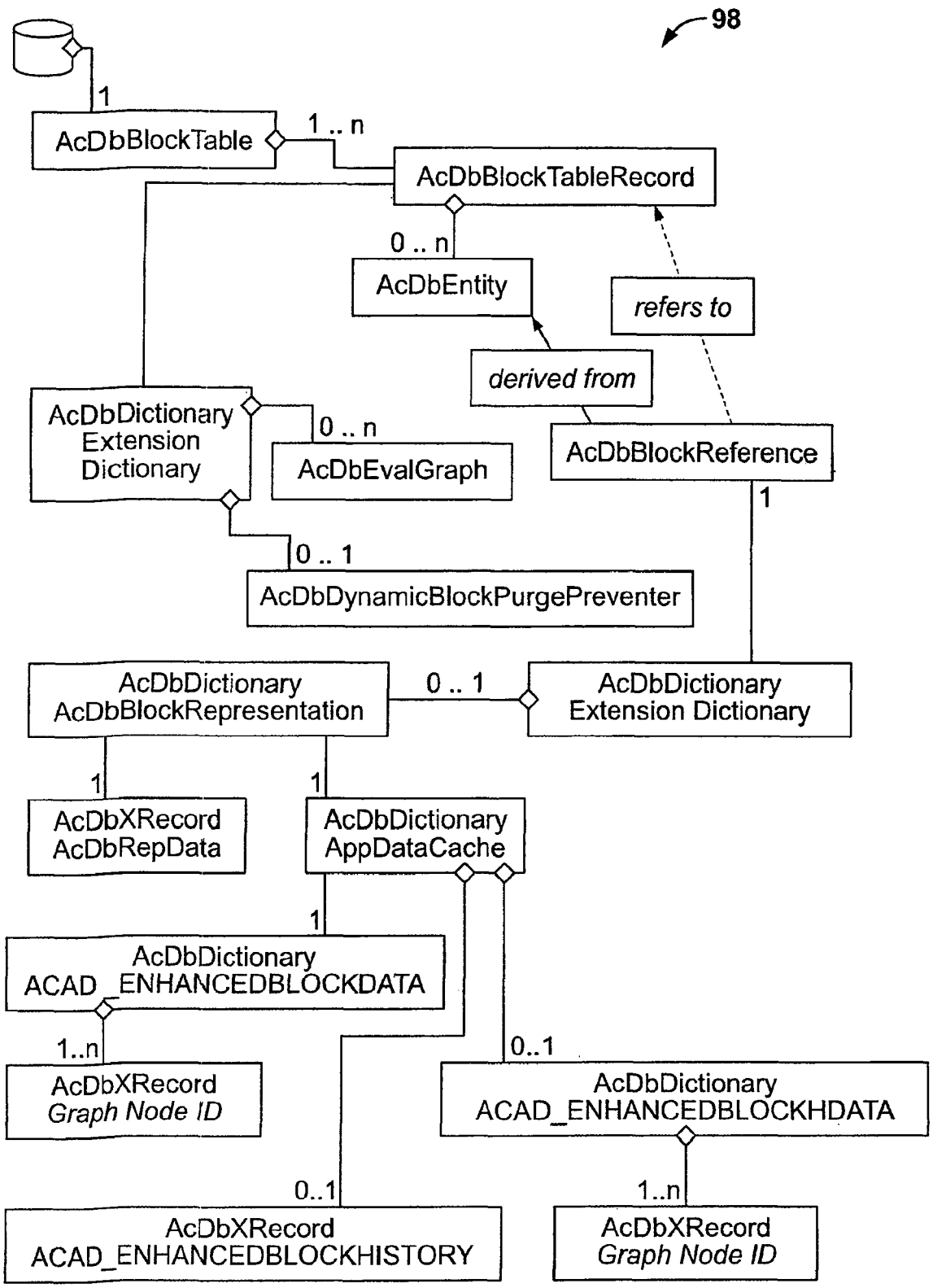

FIG. 13 is a class diagram.

FIG. 14 is a table including descriptions of class elements.

Figure 15:
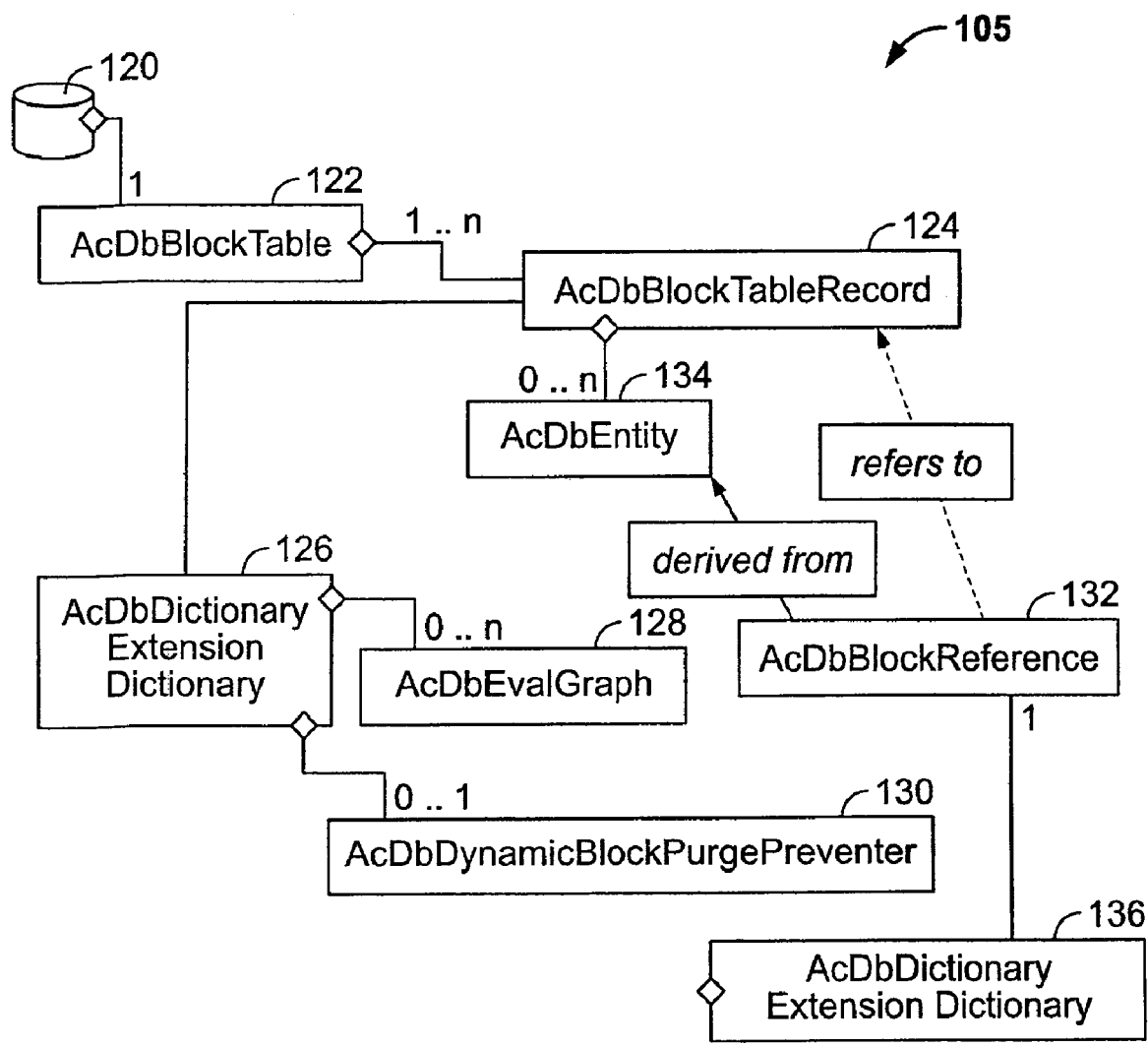
Figure 16:
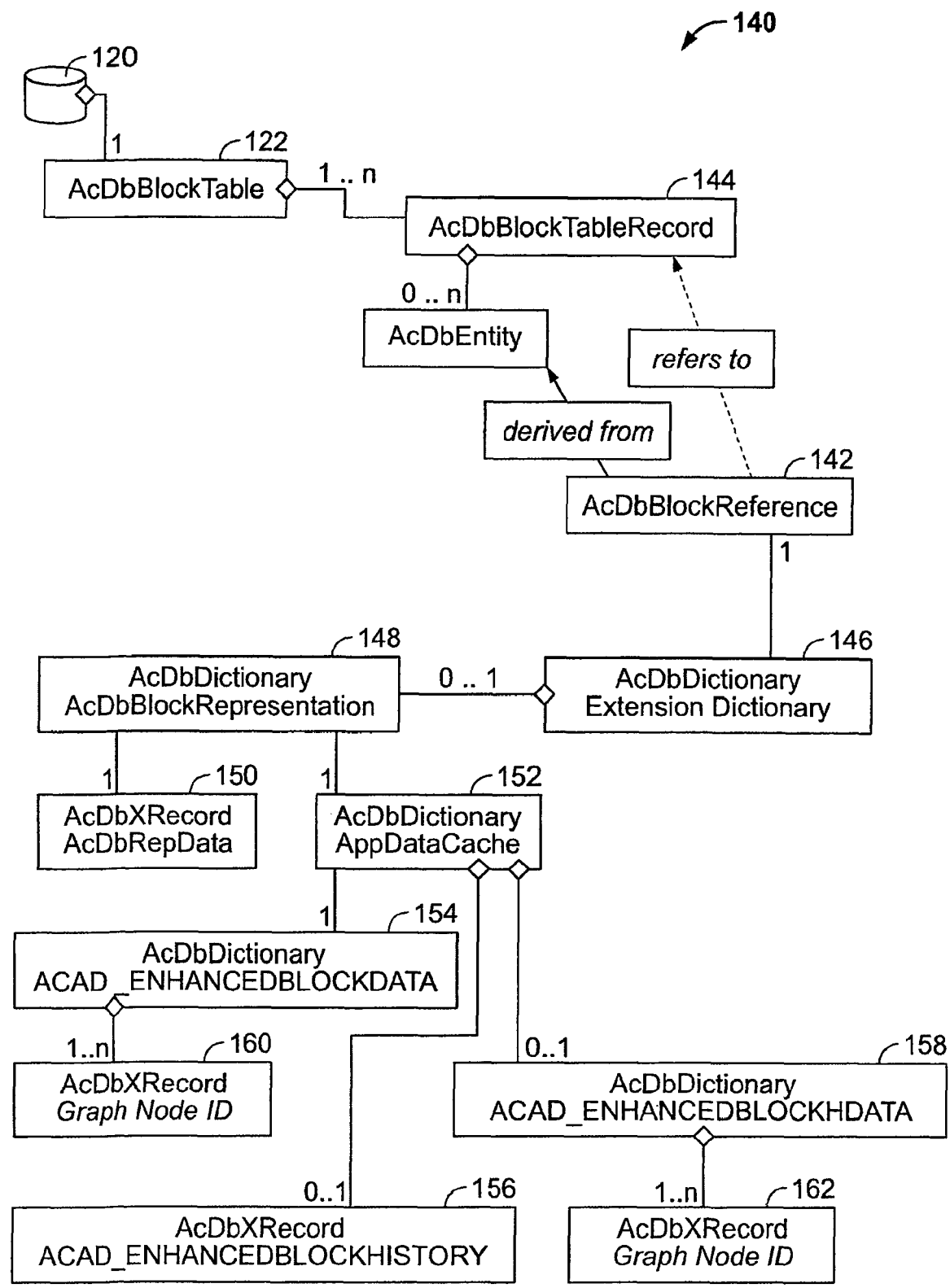

FIGS. 15 and 16 are class diagrams.

Figure 17:
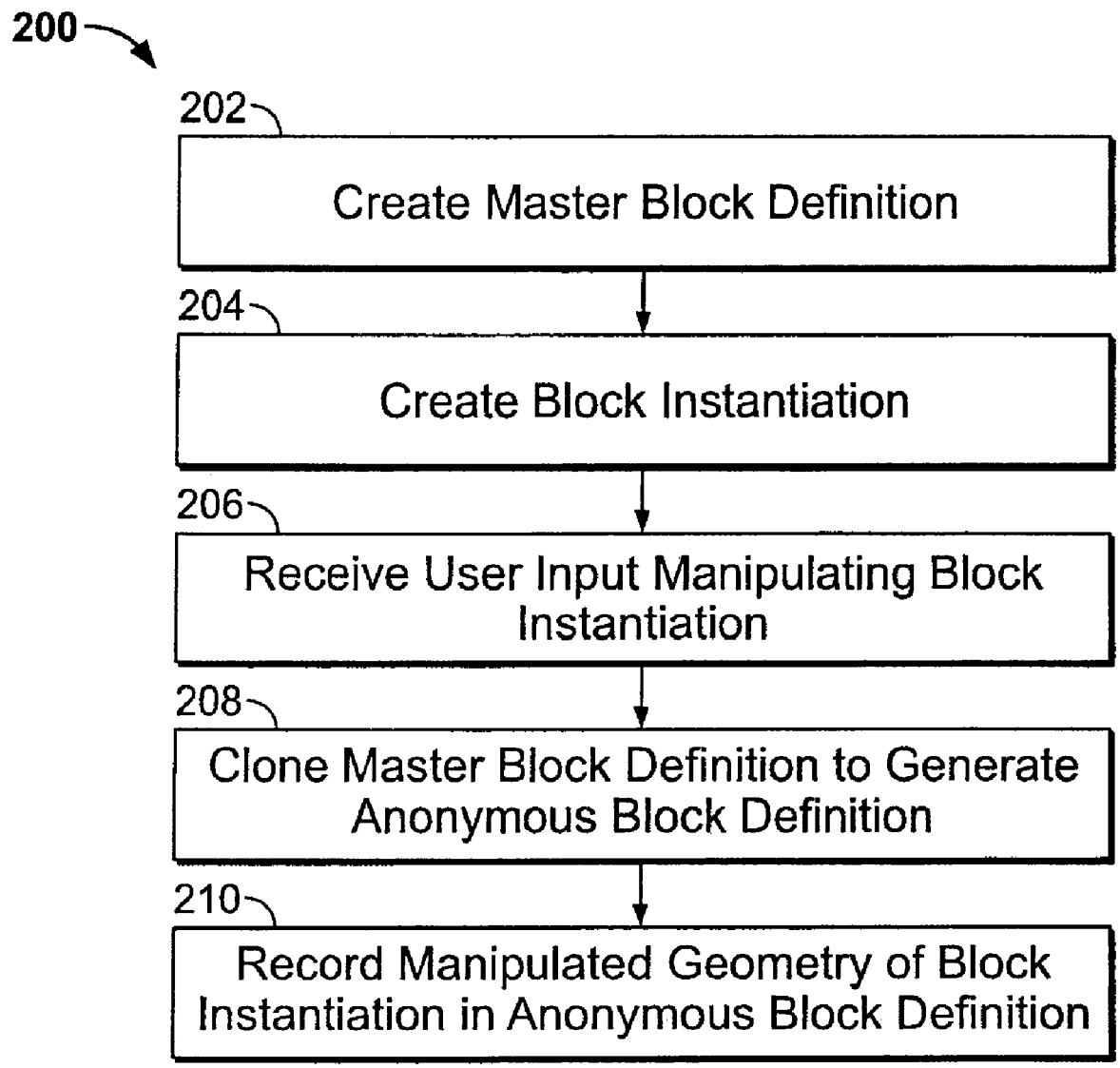

FIG. 17 is a flow chart illustrating a process for generating a block instantiation.

Figure 18:
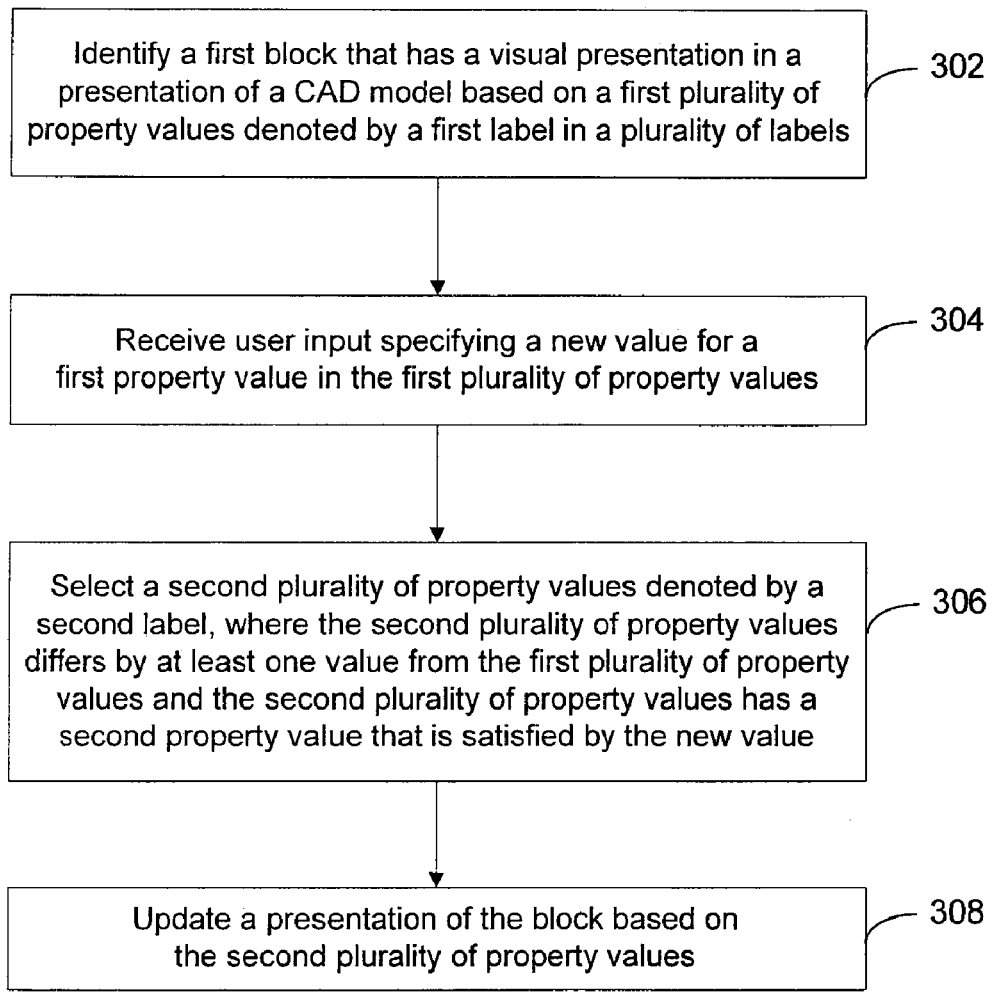

FIG. 18 is a flow chart illustrating a process for updating presentation of a block based on a table look-up.

Figure 19:
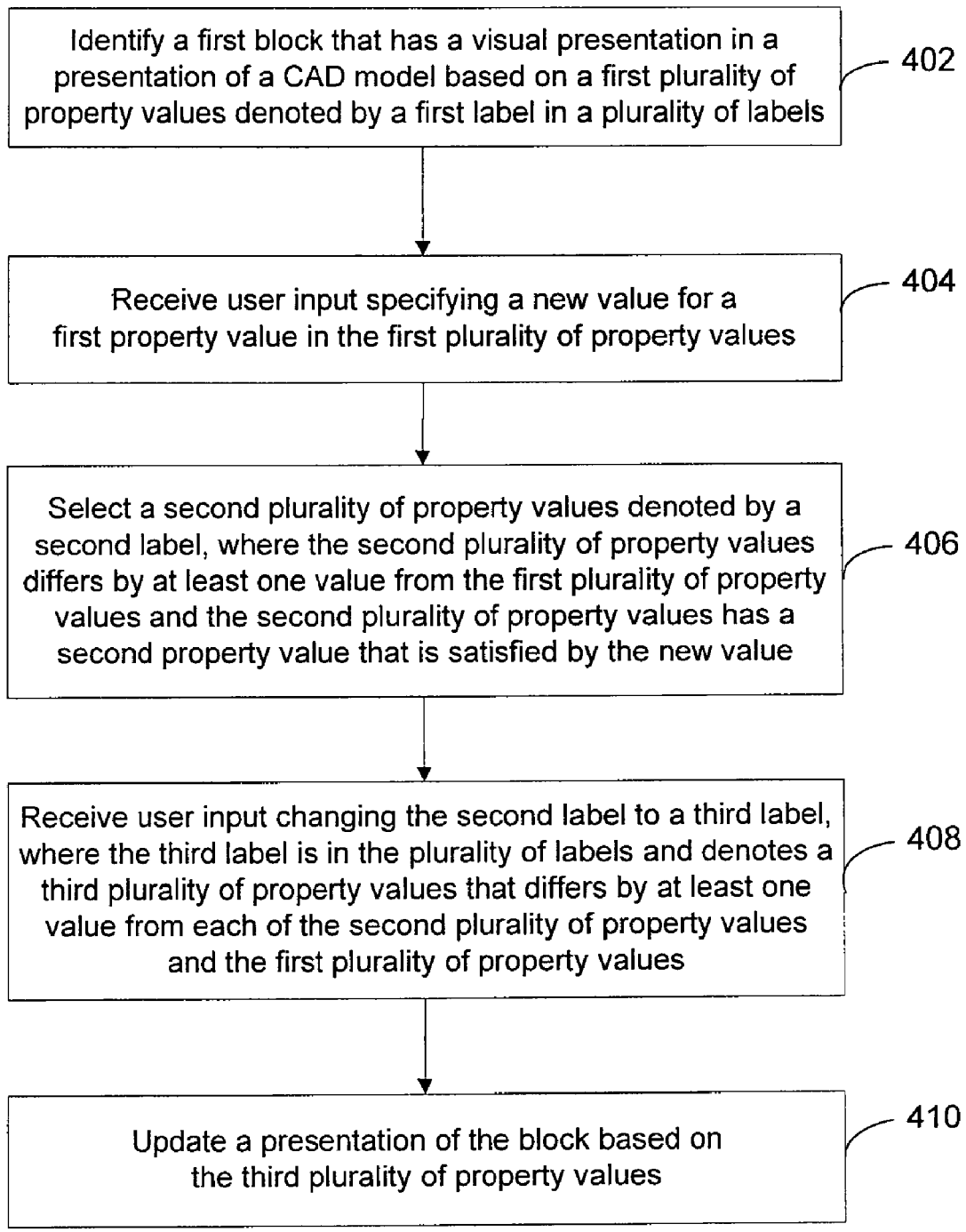

FIG. 19 is a flow chart illustrating a process for updating a presentation of a block based on a reverse table look-up.

DETAILED DESCRIPTION

Figure 1:
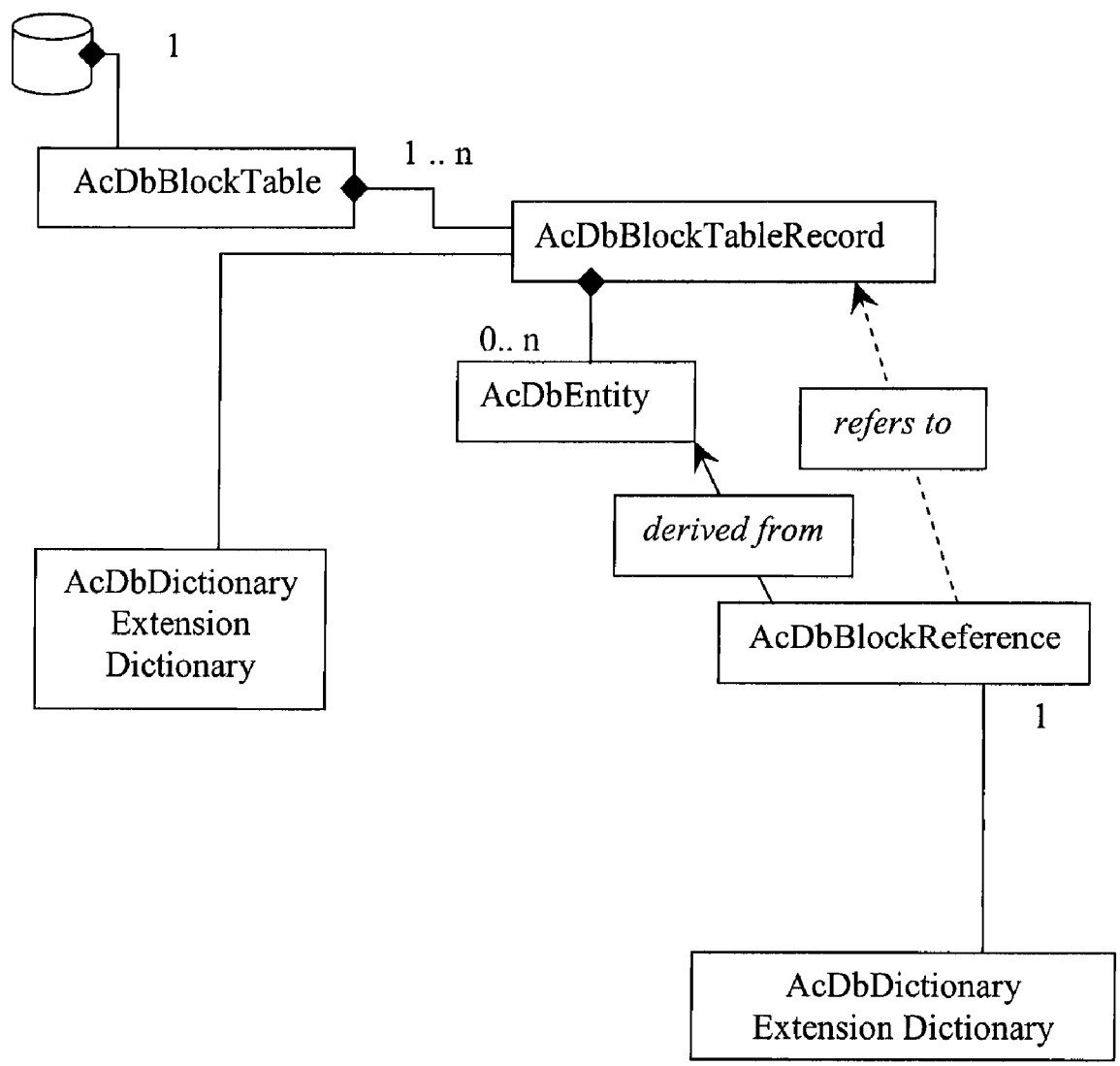
FIG. 1 is a screen shot illustrating a dynamic block feature in a CAD software application.

Referring to FIG. 1, a screen shot 100 showing a graphical user interface of a computer-aided design (CAD) application is shown. The CAD application can be, for example, AutoCad available from Autodesk, Inc., in San Rafael, Calif., or another CAD application or other software application with CAD functionality. A CAD design is shown that includes three instantiations 102, 104, 106 of a dynamic block. A dynamic block feature in a CAD application allows an object (i.e., a dynamic block) to be instantiated, and allows modifications to an instantiation without modifying a master block definition defining the dynamic block, as shall be described in further detail below.

Figure 2:
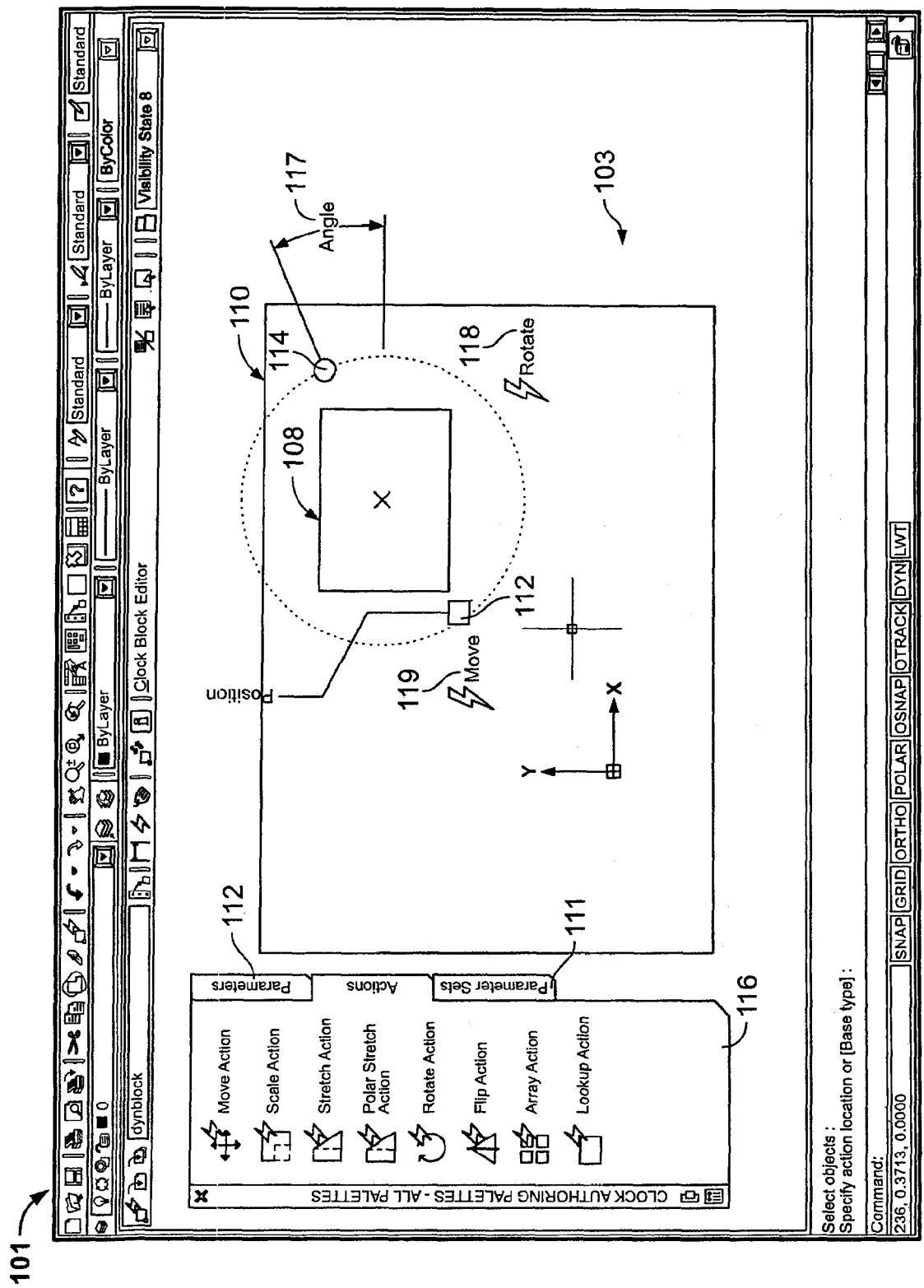
FIG. 2 is a screen shot illustrating a block editor feature in a CAD software application.

Referring to FIG. 2, a second screen shot 101 showing a graphical user interface of a CAD application is shown illustrating a user interface presented by a block editor. A user can create a master block definition defining a dynamic block using the block editor user interface. A block editor can be a software application or a tool included in a software application. The block editor can be implemented in software, hardware or firmware. As mentioned above, the block editor can have a user interface configured to receive input from a user and present information to a user. The user interface can include tools allowing a user to create and edit a master block definition for a dynamic block.

In this example, the user created a dynamic block 103 including an inner rectangular shaped entity ("inner entity") 108 nested within an outer rectangular shaped entity ("outer entity") 110. The user has further defined the dynamic block to include parameters and actions allowing manipulation of the entities within the block. In this example, the user included the following two parameters and actions: one related to movement and the second related to rotation. That is, an instantiation of the dynamic block can be manipulated by a user to rotate the inner entity 108 and/or to move the inner entity 108. In this implementation, to move the inner entity 108, the user can click and drag a grip 112. To rotate the inner entity 108, the user can click and move a grip 114. When defining the dynamic block 103, the user could have permitted other manipulations, for example, scale or stretch shown on the actions palette 116. Other permitted manipulations are possible, and the ones shown are exemplary.

A "static block" includes a definition in which the user has not included any permissible manipulations of the one or more entities within the block, i.e., defined a set position of the inner entity 108 relative to the outer entity 110. Any instantiations of the block would appear identical to one another, and changes to the block would only be possible by changing the master block definition, in which case, changes would replicate in all block instantiations. A dynamic block is different than a static block. A dynamic block is one in which the master block definition allows for one or more manipulations to the block, where each block instantiation can be manipulated differently, allowing for unique block instantiations.

In one implementation, dynamic behavior can be added to a new or existing block definition by adding parameters and actions to the block using the block editor. Parameters define custom properties for the dynamic block by specifying positions, distances and angles for geometry in the block. Actions define how the geometry of a dynamic block will move or change when an instantiation of the block is manipulated in a drawing. When a user adds actions to the dynamic block, typically the user must associate the actions with parameters.

In one implementation, a user can add parameters to a master block definition using the parameters palette 113 in the block editor user interface (see FIG. 2). A user can add actions to the master block definition using the actions palette 116 in the block editor user interface.

By way of example, referring again to FIG. 2, the block 103 includes an "angle" that represents a rotation parameter 117 and a rotate action 118, which the user interface displays as a lightening bolt and a "rotate" label. Additionally, a move action 119 is included, which the user interface displays as a lightening bolt and a "move" label. For a block to be dynamic, there must be at least one parameter, e.g., the rotation parameter 117. At least one action must be associated with the parameter, e.g., the rotate action 118 is associated with the rotation parameter 117. In this implementation, adding a parameter to the block 103 includes adding an associated grip. The grip can be used to manipulate the block 103. For example, the rotation parameter 117 includes grip 114. The grip 114 can be moved to change the value of the angle, thereby rotating the block 103. In one implementation, when a user selects a parameter, grip or action while in the block editor, any associated objects or dependencies are highlighted. For example, if the user selects the rotate action 118, the rotation parameter 117 and grip 114 are highlighted.

Parameters

The following table shows the relationships among parameters, grips and actions in one implementation. The parameter type column shows a list of 10 different parameters a user can specify for a dynamic block. The grip type column shows a list of corresponding grips that are added to the dynamic block in association with the parameter, for example, so that the value of the parameter can be manipulated. The actions column shows the one or more actions that can be associated with a given parameter. For example, the rotation parameter, discussed above in the context of FIG. 2, can be associated with the rotate action.

TABLE 1

| Parameter Type | Grip Type | Actions You Can Associate with a Parameter |
| --- | --- | --- |
| Point | ■ | Standard | Move, Stretch |
| Linear | ▶ | Linear | Move, Scale, Stretch, Array |
| Polar | ■ | Standard | Move, Scale, Stretch, Polar Stretch, Array, |
| XY | ■ | Standard | Move, Scale, Stretch, Array |
| Rotation | ⊙ | Rotation | Rotate |
| Flip | ➤ | Flip | Flip |
| Alignment | ▷ | Alignment | None (The action is implied and contained within the parameter.) |
| Visibility | ▼ | Lookup | None (The action is implied and controlled by visibility states.) |
| Lookup | ▼ | Lookup | Lookup |
| Base | ■ | Standard | None |

A master block definition for a dynamic block must include at least one parameter. When a parameter is added, the grip associated with the key points of the parameter are automatically added. A key point is a point on a parameter that drives the associated action when edited. The user then adds an action to the master block definition and associates the action with the parameter. In a drawing, the user can use the grip to manipulate an instantiation of the block. In one implementation, a "properties" palette can be included in a user interface that includes values of parameters and a user can manipulate an instantiation of the block in a drawing by changing the value of the parameters in the properties palette. Changing the value of a parameter, e.g., by manipulating the grip or using the properties palette, drives the action that is associated with the parameter and can change the geometry of the block instantiation.

In one implementation, some parameters can have a fixed set of values, minimums and maximum values or increment values. For example, a linear parameter used in a window block can have the following fixed set of values: 10, 20, 30 and 40. When an instantiation of the block is included in a drawing, a user can only change the window to one of the fixed set of values. The following table lists and describes the types of parameters that can be added to a master block definition of a dynamic block and the types of action that can be associated with each parameter. Other parameters are possible, and the listing below is merely illustrative.

includes a point parameter 49 and a move action associated with the point parameter. The move action's selection set includes all the geometry in the block 51 (i.e., the chair). When a user uses the grip 52 associated with the point parameter 49, or changes the position X or position Y properties in the properties palette, to manipulate an instantiation of block 51, the value of the point parameter changes. The change in

TABLE 2

| Parameter Type | Description | Supported Actions |
| --- | --- | --- |
| Point | Defines an X and Y location in the drawing. In the Block Editor, looks similar to an ordinate dimension. | Move, Stretch |
| Linear | Shows the distance between two anchor points. Constrains grip movement along a preset angle. In the Block Editor, looks similar to an aligned dimension. | Move, Scale, Stretch, Array |
| Polar | Shows the distance between two anchor points and displays an angle value. You can use both grips and the Properties palette to change both the distance value and the angle. In the Block Editor, looks similar to an aligned dimension | Move, Scale, Stretch, Polar Stretch, Array, |
| XY | Shows the X and Y distances from the base point of the parameter. In the Block Editor, displays as a pair of dimensions (horizontal and vertical). | Move, Scale, Stretch, Array |
| Rotation | Defines an angle. In the Block Editor, displays as a circle. | Rotate |
| Flip | Flips objects. In the Block Editor, displays as a reflection line. Objects can be flipped about this reflection line. Displays a value that shows if the block reference has been flipped or not. | Flip |
| Alignment | Defines an X and Y location and an angle. An alignment parameter always applies to the entire block and needs no action associated with it. An alignment parameter allows the block reference to automatically rotate around a point to align with another object in the drawing. An alignment parameter affects the rotation property of the block reference. In the Block Editor, looks like an alignment line. | None (The action is implied and contained within parameter.) |
| Visibility | Controls the visibility of objects in the block. A visibility parameter always applies to the entire block and needs no action associated with it. In a drawing, you click the grip to display a list of visibility states available for the block reference. In the Block Editor, displays as text with an associated grip. | None (The action is implied and controlled by visibility states.) |
| Lookup | Defines a custom property that you can specify or set to evaluate a value from a list or table you define. It can be associated with a single lookup grip. In the block reference, you click the grip to display a list of available values. In the Block Editor, displays as text with an associated grip. | Lookup |
| Base | Defines a base point for the dynamic block reference relative to the geometry in the block. Cannot be associated with any actions, but can belong to an action's selection set. In the Block Editor, displays as a circle with crosshairs. | None |

Actions

Actions define how the geometry of a dynamic block reference will move or change when the custom properties of a block instantiation are manipulated in a drawing. Generally, when an action is added to a master block definition of a dynamic block, the action is associated with a parameter. The table below includes a listing of exemplary action types and the associated parameters for one implementation.

TABLE 3

| Action Type | Parameter |
| --- | --- |
| Move | Point, linear, polar, XY |
| Scale | Linear, polar, XY |
| Stretch | Point, linear, polar, XY |
| Polar Stretch | Polar |
| Rotate | Rotation |
| Flip | Flip |
| Array | Linear, polar, XY |
| Lookup | Lookup |

Move Action

Figure 3:
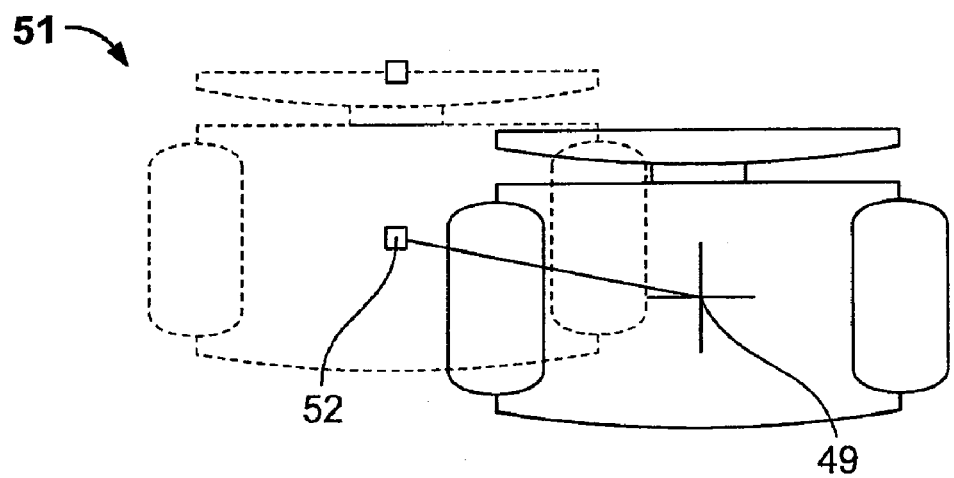
FIG. 3 is an exemplary dynamic block illustrating a point parameter and move action.

The move action causes an object to move a specified distance and/or angle. As indicated in Table 3, the move action can be associated with the point, linear, polar or XY parameters. In a block instantiation, if a user changes a value of a parameter associated with a move action, e.g., through a grip or the properties palette, the changed value may affect the key point on the parameter associated with the move action. If the key point is affected, the geometry in the move action's selection set will move. For example, referring to FIG. 3, a dynamic block 51 representing a chair is shown. The block 51 value causes the block 51 to move. In the example shown, the instantiation of the block 51 is moved by dragging the point parameter grip 52. The new position of the grip 52 is reported in the properties palette.

When a move action is associated with an XY parameter, the move action can have an override property called "distance type". This property specifies whether the distance applied to the move is the parameter's X value, Y value or X and Y coordinate value from the parameter's base point. For example, if a user specifies X distance as the distance type for a move action in a master block definition of a dynamic block, this means that a block instantiation can only be moved on the X axis and a user cannot move the block instantiation on the Y axis.

Scale Action

The scale action causes a dynamic block's selection set to scale when the associated parameter is edited, e.g., by moving grips or using the properties palette. In one implementation, a scale action is associated with an entire parameter, not a key point on the parameter. As indicated in Table 3, a scale action can be associated with a linear, polar or XY parameter. After associating the scale action with a parameter, the user associates the action with a selection set of geometry. The scale action includes a property called "base type". With this property, a user can specify whether the base point for the scale factor is dependent or independent. If the base type is dependent, then the objects in the selection set scale relative to the base point of the parameter with which the scale action is associated. For example, referring to FIG. 4A, an instantiation of a block 53 is shown and a scale action is associated with an XY parameter. The scale action base type is dependent. The base point 54 of the XY parameter is located at the lower left corner of the rectangle. When the custom grip 55 is used to scale the block 53, the block 53 is scaled relative to the lower left corner of the rectangle, i.e., relative to the base point 54.

Referring to FIG. 4B, a scale action is associated with an XY parameter and the scale action base type is independent. If the base type is independent, the user specifies a base point independent of the parameter with which the scale action is associated. The objects in the selection set will scale relative to the independent base point specified. In the example shown, the block 56 includes an independent base point 57 located at the center of the circle. When the custom grip 58 is used to scale the block 56, the block 56 is scaled relative to the center of the circle, i.e., relative to the independent base point 57.

When a scale action is associated with an XY parameter, the scale action can include an override property called "scale type". This property specifies whether the scale factor applied is the parameter's X distance, Y distance or X and Y coordinate value distance from the parameter's base point. For example, if a user specifies X distance as the scale type for a scale action in a master block definition, then in a drawing when the user edits an instantiation of the block, e.g., by dragging a grip on the XY parameter, if the grip is only dragged along the Y axis, the associated geometry will not scale.

Stretch Action

A stretch action causes objects to move and stretch a specified distance in a specified location. As indicate in Table 3, a stretch action can be associated with a point, linear, polar or XY parameter. After associating a stretch action with a parameter, the user specifies a stretch frame for the stretch action. The user then selects the objects for the stretch action's selection set. The stretch frame determines how the objects within or crossed by the frame are edited in a block instantiation. For example, in one implementation a stretch frame is defined such that: objects entirely within the frame are moved; objects that cross the frame are stretched; objects within or crossed by the frame, but not included in the selection set are not stretched or moved; and objects outside the frame and included in the selection set are moved. Other variations of the stretch frame definition are possible.

Referring to FIG. 5A, a stretch frame 60 is indicated by a dashed line and the selection set 61 has a haloed effect. The top circle 62, while enclosed by the stretch frame 60, is not included in the selection set, so the top circle 62 will not move. The bottom circle 63 is entirely enclosed in the stretch frame 60 and included in the selection set 61, so the bottom circle 63 will move. The rectangle 64 is crossed by the stretch frame 60 and included in the selection set 61 and so the rectangle 64 will stretch. If in an instantiation of the block, the value of a parameter associated with the stretch action is changed, e.g., through a grip or the properties palette, the key point on the parameter may be affected. If the key point is affected, the geometry in the stretch action's selection set will move, as shown in FIG. 5B.

When a stretch action is associated with an XY parameter, the stretch action can have an override property called "distance type". This property specifies whether the distance applied to the move is the parameter's X value, Y value or X and Y coordinate values from the parameter's base point. For example, if a user specifies X distance as the distance type for a stretch action in a master block definition of a dynamic block, then in a drawing when a user tries to edit an instantiation of the block by dragging the key point only along the Y axis, the associated geometry will not move.

Polar Stretch Action

A polar stretch action rotates, moves and stretches objects a specified angle and distance when a key point on the associated polar parameter is changed, e.g., through a grip or the properties palette. A polar stretch can only be associated with a polar parameter. The base point for the stretch part of the action is the parameter point opposite the key point. Referring to FIG. 6A, after associating a polar stretch action with a polar parameter, the user specifies a stretch frame 65 for the polar stretch action. The user then selects objects to stretch and objects to rotate, for example, in one implementation the stretch frame is defined such that: objects entirely within the frame 65 are moved; objects that cross the frame 65 are stretched; objects in the action's selection set specified to rotate only are not stretched; objects within the frame are moved linearly after they are rotated; objects crossed by the frame are stretched linearly after they are rotated; objects within or crossed by the frame, but not included in the selection set, are not stretched or rotated; and objects outside the frame and included in the selection set are moved. Other variations of the stretch frame are possible.

In the example shown, the frame 65 is indicated by the dashed line and selection set 66 has a haloed effect. The top circle 67, while enclosed by the stretch frame, is not included in the selection set 66, so the top circle 67 will not move. The bottom circle 68 is entirely enclosed in the stretch frame and included in the stretch selection set, so the bottom circle 68 will move. The rectangle 69 is crossed by the stretch frame 65 and included in the selection set 66, so the rectangle 69 will stretch. The square 70 is entirely enclosed in the frame 65 and included in the rotate selection set, but not the stretch selection set, so the square will rotate only. In a block instantiation, if a user changes the value of a parameter associated with a polar stretch action, e.g., through a grip or the properties palette, the change may affect the key point on the parameter associated with the polar stretch action. If the key point is affected, the geometry in the polar stretch action's selection set will move or rotate depending on how the block was defined. An example of affect of changing a value of a parameter is shown in FIG. 6B.

Rotate Action

The rotate action causes associated objects to rotate when the associated parameter is edited, e.g., through a grip or the properties palette. A rotate action can only be associated with a rotation parameter, and is associated with the entire parameter not a key point on the parameter. After associating a rotate action with a rotation parameter, the user associates the action with a selection set of geometry. The rotate action can include a property called "base type". With this property, a user can specify whether the base point for the rotation is the base point of the parameter or an independent base point that the user specifies in the master block definition. If the base type is set to dependent, the block rotates around the associated rotation parameter's base point. For example, as shown in FIG. 7A, the chair block 71 includes a rotation parameter and an associated rotate action. The rotate action's base type is dependent. The base point 72 of the parameter is at the center of the chair. Thus, the chair 71 rotates about the center point 72.

If a user sets the base type to independent, the user can specify a base point for the rotate action other than the base point of the associated rotation parameter. This independent base point can be shown in the block editor as an X marker. The location of the independent base point can be changed by dragging the base point or by editing the base X and base Y values in the overrides section of the properties palette. Referring to FIG. 7B, the chair block 73 includes a rotation parameter and an associated rotate action. The rotate action's base type is independent. The independent base point 74 is located at the lower left corner of the chair block 73. Thus, the chair rotates about the lower left corner, i.e., the base point 74.

Referring to FIG. 7C, a block instantiation 75 is shown including three rectangles 76a-c. Each of the three rectangles 76a-c rotates about an independent base point 77a-c located at the lower left corner of each rectangle. One way to achieve this is to assign one rotation parameter. A user then adds three rotate actions. Each rotate action is associated with the rotate parameter. Each rotate action is then associated with a different object, i.e., 76a, b or c, and assigned a different independent base point, i.e., 77a, b or c. The same result can also be achieved by using dependent base points, each with a different base offset, for each rotation action.

Flip Action

A flip action allows a block instantiation to be flipped about a specified axis referred to as a reflection line when the associated parameter is edited, e.g. through a grip or the properties palette. A flip action can only be associated with a flip parameter, and is associated with the entire parameter, not a key point on the parameter. After associating a flip action with a flip parameter, the user associates the action with a selection set of geometry. Only the selected objects will flip about the reflection line. Referring to FIG. 8, a block 78 is shown. The block 78 can be flipped about the reflection line 79, as shown on the right hand side of the drawing.

Array Action

An array action causes associated objects to copy and array in a rectangular pattern when the associated parameter is edited, e.g., through a grip or the properties palette. An illustrative example of an array action is shown in reference to block 80 in FIG. 9A. An array action can be associated with a linear, polar or XY parameter. After associating an array action with a parameter, the user associates the action with a selection set of geometry. When an array action is associated with a liner or polar parameter, the user specifies a column offset for the arrayed objects. The column offset determines the distance between the array objects. When a user edits the parameter in a block instantiation, the distance of the parameter (from base point to second point) is divided by the column offset to determine the number of columns (the number of objects). For example, a user may associate an array action with a linear parameter. The user specifies that the array action has a column offset of 2. When the linear parameter in a block instantiation is changed to a distance of 10, the number of columns for the block instantiation is 5. If an array action is associated with an XY parameter, the user can also specify the row offset.

If a user includes a parameter in an array action's selection set, it has no effect on the behavior of the block instantiation. The parameter is not copied with the other objects in the selection set. Additional grips are not displayed in the block instantiation. In the example shown in FIG. 9B, a parking lot block 82 can be arrayed to include any number of parking spaces. The vertical line defining a parking space can also be rotated. Notice that even after the block 82 has been array, the block 82 still includes only one rotation grip 83. However, if a user edits the grip 83 for the parameter included in the array action's selection set, the parameter's associated action is triggered for all instances of the objects. The same behavior occurs when the parameter is not included in the array actions selection set.

A dynamic block can include an array action and a rotate action that have the same selection set. The order in which the block instantiation is arrayed and rotated affects the display of the block. For example, referring to FIG. 9C, when a user rotates the block first and then arrays it, all instances of the arrayed objects are individually rotated around their own base point. By contrast, referring to FIG. 9D, when a user arrays the block first and then rotates it, all instances of the arrayed objects are rotated about a single base point.

Look-up Action

One or more so-called look-up actions can be added to a master block definition for a dynamic block and associated with a look-up parameter. A look-up action involves comparing an input value to one or more known input values and determining an output value based on an identified match between the input value and a known input value. Adding one or more look-up actions to a master block definition will create a look-up table. A look-up table is a listing of related input values and output values, such that a look-up action can be performed using the look-up table. The look-up table can be used to assign custom properties and values to a dynamic block.

Referring to FIG. 10A, a bed block 40 has associated with it a size property value defined by a width 43 and a length 44. A bed is an example of a common, everyday item that can be stored in or associated with a drawing (e.g., a CAD model) as a block and dragged into a drawing as needed. An item is a real-world thing that can be represented by a block in a drawing. Examples of other common items include light fixtures and other furniture.

Many types of common items have standard configurations. For example, a bed comes in standard sizes, such as twin and queen, which have a predefined length and a predefined width, and is usually visually depicted as having two pillows at the top of the bed. For common items such as these, it is easier for users to specify a standard configuration (e.g., "queen") than input values for each of the parameters (e.g., length, width, and number of pillows) associated with the standard configuration.

By way of illustration, instead of requiring users to manipulate the bed block 40 manually so that the bed block 40 is of a particular size, or has particular dimensions, users can specify a standard bed size (e.g., twin, extra-long twin, full/double, queen, king, California king), and have the size of the bed block (e.g., width 43 and length 44) automatically adjust to the dimensions of the selected standard size. In addition, upon selection of a bed size, size-specific attributes (such as, for example, number of pillows), also will be adjusted appropriately. For example, a twin bed may include one pillow, while a king size bed may include three pillows.

Additionally, or alternatively, rather than selecting a standard bed size for bed block 40, and having the bed automatically reset to dimensions associated with that size, a user can manually input values for the dimensions of the bed block 40, causing an appropriate label to be applied to the bed block 40 (as a queen, for example), when the dimensions correspond to one of the standard sizes. A property is satisfied if it matches the user input or if a user input falls within a range for the property. Thus, if a user manipulates the bed block 40 to conform to a standard size (which is recognized based on a look-up table, as described below), the standard size is satisfied by the bed block 40, and, as such, a label associated with the standard size is applied to the bed block 40. This process may be referred to as a reverse look-up.

To do so, a look-up table user interface 45 (or "look-up table"), as shown in FIG. 10B, may be used to set property values of the bed block 40. The look-up table 45 can be a user-constructed table in that a user created the table to define property values for a bed block, or, alternatively, can be a pre-defined table that was included in a library of block definitions. Additionally, or alternatively, a look-up table could be a pre-defined table that has been edited or reconfigured by a user to change some values of the bed block. For example, a user can change the number of pillows associated with a twin bed in a pre-defined bed block look-up table from one to two.

The property values can include single, discrete values or a range of values. The look-up table 45 includes a column 46 for input properties and a column 47 for look-up properties 47. Input properties 46 include bed width 46a, bed length 46b and pillow visibility 46c, while look-up properties that correspond to each row underneath columns 46a-46c include bed size 47a. As such, the columns are divided into two sets—the property label (e.g., set under the bed size 47a column), and property values associated with corresponding label (e.g., set under the bed width 46a, bed length 46b, and visibility 46c columns).

The look-up table may be used in the following manner. A user selects a bed size of twin from a drop down menu 42. As such, the look-up property for the bed block 40 includes the label twin. The bed block 40 then may be resized to have dimensions that correspond to the label twin, such as, a bed width of 39, a bed length of 75, and may cause one pillow to be visible on the bed.

The look-up table 45 includes parameters in two dimensions, such as, for example, bed block width and bed block length. However, a look-up table also may be used to define a parameter in the third dimension, such as, for example, bed block depth.

In addition, a look-up table may include a constraint parameter where a user may select a particular type of constraint (e.g., one-way constraint or two-way constraint) to be applied to blocks that are associated with the look-up table. A one-way constraint is a requirement that a change to a property value of a fist block affects a property value of a second block. A two-way constraint is a requirement that a change to a property value of a first block affects a property value of a second block and a change to the property value of the second block affects the property value of the first block. For example, a user may specify that the bed block 40 includes a one-way constraint with all nightstand blocks. As such, a bed block 40 may be placed within one foot of, and perpendicular to, a nightstand block. Because of the one-way constraint, whenever a user changes the bed block 40 (e.g., moves it, scale it, or change its angle), the nightstand block moves and reorients itself so that it is always within one foot of, and perpendicular to, the bed block 40. However, in a one-way constraint, movement of the nightstand block does not affect the placement or size of the bed block 40. In another example, a user may specify that the bed block 40 includes a two-way constraint with all nightstand blocks, and as such, movement or resizing of either a bed block 40 or a nightstand block may cause the other to move or be resized accordingly.

If a user wishes to allow reverse look-up (e.g., application of a bed size label to a bed that has been manually manipulated to conform to a standard size), the user may include an allow reverse look-up command 49 in the look-up table 45. For example, a user may manipulate the bed block 40 to have a width 44 of 39 and a length 44 of 75. As such, the look-up table 45 may recognize that the bed block 40 has been set to the standard size for a twin bed, and thus apply a twin label to the bed block 40.

By allowing reverse look-up, one of columns 46 and 47 includes input values and the other includes output values, but depending on the context (e.g., whether a look-up or reverse look-up is being performed), each of the columns 46 and 47 may play either role. The input properties (e.g., selection of a label or manual scaling of a block) are inspected during evaluation and the output properties (e.g., size of a block or a label) are set to a value in each column at the first row which matches the input properties, and evaluation continues. In order for a column to represent an output property, the cell contents must be scalar values, rather than ranges.

A user may manually manipulate the bed block 40 to a size that is not one of the standard sizes. For example, the user may manipulate the bed block 40 to have a width 43 of 75 and a length 44 of 92. As such, these inputs to the look-up table may be referred to as unmatched. As shown in look-up table 45, when a size input is unmatched, a label of custom size 48 may be applied to the bed block 40.

To allow concise expression, a range syntax is provided for users to enter properties (of type double) into look-up table 45: (1) recognize architectural and mechanical unit syntax (e.g., 15'¼"), (2) a comma is a delimiter between values or intervals, (3) users can specify any number of unique values separated by commas (e.g., 5.5,6.25), (4) a continuous range between two numbers is indicated by bracketed pairs with the pair of values separated by a comma, where square brackets indicate the range includes the specified numeric pair and parentheses indicate greater or less than the specified numeric pair (e.g., [3,10] represents a range between 3 and 10 including 3 and 10 and (−2,−5) represents a range between −2 and 5, not including −2 or 5), and (5) to specify an open-ended range, only one of the values in the pair is specified (e.g., [,5] represents less than or equal to 5 and (4,) represents greater than 4).

Once a look-up table has been created for a particular block, a look-up grip 41 may be associated with the block. A user may select the look-up grip 41, and, in response, be presented with a drop-down menu 42 that includes labels (e.g., bed sizes) available for the block. The user may select a label (e.g., bed size) to cause the bed block 40 to automatically adjust to the size dimensions associated in the look-up table 45 with the selected label. For example, if a user selects the label twin from drop-down menu 42, the bed block 40 may be resized to include a bed width 43 of 39, a bed length 44 of 75, and show one pillow.

Referring now to FIG. 18, a flow chart is shown illustrating a process 300 for updating presentation of a block based on a table look-up. A first block, which has a visual presentation in a presentation of a CAD model, is identified based on a first plurality of property values denoted by a first label in a plurality of labels (302). For example, bed block 40 is identified as being associated with a first plurality of property values that includes a bed width property value of 54 and a bed length property value of 75. The property values included in the first plurality of property values are denoted by a first label of full/double.

User input specifying a new value for a first property value in the first plurality of property values is received (304). For example, a user resizes the bed block 40 to have a bed width of 60. A second plurality of property values denoted by a second label is selected, where the second plurality of property values differs by at least one value from the first plurality of property values and the second plurality of property values has a second property value that is satisfied by the new value (306). For example, a second plurality of property values includes a bed width of 60 and a bed length of 80, which is denoted by a second label of queen. The new value of a bed width of 60 satisfies a second property value included within the second plurality of property values because the second plurality of property values includes a bed width of 60.

The presentation of the block is updated based on the second plurality of property values (308). For example, the bed block 40 is resized to include a bed width of 60.

Referring to FIG. 19, a flow chart is shown illustrating a process 400 for updating presentation of a block based on a reverse table look-up. As in process 300, a first block, which has a visual presentation in a presentation of a CAD model, is identified based on a first plurality of property values denoted by a first label in a plurality of labels (402). For example, bed block 40 is identified as being associated with a first plurality of property values that includes a bed width property value of 54 and a bed length property value of 75. The property values included in the first plurality of property values are denoted by a first label of full/double.

Also as in process 300, (1) user input specifying a new value for a first property value in the first plurality of property values is received (404), such as, for example, a user resizes the bed block 40 to have a bed width of 60; and (2) a second plurality of property values denoted by a second label is selected, where the second plurality of property values differs by at least one value from the first plurality of property values and the second plurality of property values has a second property value that is satisfied by the new value (406). For example, a second plurality of property values includes a bed width of 60 and a bed length of 80, which is denoted by a second label of queen. The new value of a bed width of 60 satisfies a second property value included within the second plurality of property values because the second plurality of property values includes a bed width of 60.

User input that changes the second label to a third label is received, where the third label is included in the plurality of labels and denotes a third plurality of property values that differs by at least one value from each of the second plurality of property values and the first plurality of property values (404). For example, using a look-up grip 41, a user selects a label of twin, from a drop-down menu 42, thereby changing the label associated with the bed block 40 from the second label full/double to a label of twin. The third label of twin denotes a third plurality of property values that includes a bed width of 39 and a bed length of 75, which differ by at least one value from the first plurality of property values (which includes bed width of 60 and bed length of 80) and the second plurality of property values (which includes bed width of 54 and a bed length of 75).

A presentation of the block is updated based on the third plurality of property values (410). For example, the bed block 40 is resized to have a bed width of 39 and a bed length of 75 denoted by a label twin.

Override Properties

Some actions can include offset override properties. These properties allow a user to specify a factor by which a parameter value is increased or decreased when the parameter is edited in a block instantiation. Action overrides are properties of actions. However, they have no effect on the block instantiation until the block instantiation is manipulated in a drawing. In one implementation, there are two types of overrides: distance multiplier and angle offset. A user can use the distance multiplier property to change a parameter value by a specified factor. For example, if the distance multiplier property is set to 2 for a stretch action, the associated geometry in the block instantiation increases and doubles the distance of the grip movement. The angle offset property can be used to increase or decrease the angle of a changed parameter value by a specified amount. For example, if the angle offset property of a move action is set to 90, the block instantiation will move 90 degrees beyond the angle value of the grip movement.

In one implementation, a user can specify the action override properties by following the prompts on the command line when a user adds an action to a master block definition. A user can also specify these properties in the properties palette when selecting an action in the block editor. The following table shows the available override properties for each type of action in one implementation.

TABLE 4

| Action Type | Available Override Properties |
| --- | --- |
| Move | Distance Multiplier, Angle Offset |
| Scale | None |
| Stretch | Distance Multiplier, Angle Offset |
| Polar Stretch | Distance Multiplier, Angle Offset |
| Rotate | None |
| Flip | None |
| Array | None |
| Lookup | None |

Parameter Sets

Referring again to FIG. 2, the "Parameter Sets" tab 111 on the block authoring palette can be used to add commonly paired parameters and actions to a master block definition for a dynamic block. A parameter set can be added to a dynamic block the same way a parameter can be added. The action included in the parameter set is automatically added to the master block definition and associated with the added parameter. The user must then associate a selection set (geometry) with each action. The following table lists the parameter sets provided on the Parameter Sets tab 111 in one implementation.

TABLE 5

| Parameter Set | Description |
| --- | --- |
| Point Move | Adds a point parameter with one grip and an associated move action to the dynamic block definition. |
| Linear Move | Adds a linear parameter with one grip and an associated move action to the dynamic block definition. |
| Linear Stretch | Adds a linear parameter with one grip and an associated stretch action to the dynamic block definition. |
| Linear Array | Adds a linear parameter with one grip and an associated array action to the dynamic block definition. |
| Linear Move Pair | Adds a linear parameter with two grips and a move action associated with each grip to the dynamic block definition. |
| Linear Stretch Pair | Adds a linear parameter with two grips and a stretch action associated with each grip to the dynamic block definition. |
| Polar Move | Adds a polar parameter with one grip and an associated move action to the dynamic block definition. |
| Polar Stretch | Adds a polar parameter with one grip and an associated stretch action to the dynamic block definition. |
| Polar Array | Adds a polar parameter with one grip and an associated array action to the dynamic block definition. |
| Polar Move Pair | Adds a polar parameter with two grips and a move action associated with each grip to the dynamic block definition |
| Polar Stretch Pair | Adds a polar parameter with two grips and a stretch action associated with each grip to the dynamic block definition. |
| XY Move | Adds an XY parameter with one grip and an associated move action to the dynamic block definition. |
| XY Move Pair | Adds an XY parameter with two grips and move action associated with each grip to the dynamic block definition. |

TABLE 5-continued

| Parameter Set | Description |
| --- | --- |
| XY Move Box Set | Adds an XY parameter with four grips and a move action associated with each grip to the dynamic block definition. |
| XY Stretch Box Set | Adds an XY parameter with four grips and a stretch action associated with each grip to the dynamic block definition. |
| XY Array Box Set | Adds an XY parameter with tour grips and an array action associated with each grip to the dynamic block definition. |
| Rotation | Adds a rotation parameter with one grip and an associated rotate action to the dynamic block definition. |
| Flip | Adds a flip parameter with one grip and an associated flip action to the dynamic block definition. |
| Visibility | Adds a visibility parameter with one grip. No action is required with a visibility parameter. |
| Lookup | Adds a lookup parameter with one grip and a lookup action to the dynamic block definition. |

When a parameter is added to a master block definition, custom grips associated with key points of the parameter are automatically added to the dynamic block, as discussed above in reference to the various exemplary parameters. In a drawing, a user can use the custom grips to manipulate the geometry of a block instantiation. Certain of the parameters have a property called "Number of Grips". When a user selects a parameter in the block editor, the Number of Grips property is displayed in the properties palette. The property allows a user to specify, e.g., from a preset list, the number of grips the user wants displayed for the parameter. A user can specify that a parameter has 0 grips, in which case the user can still edit a block instantiation through the properties palette.

Visibility States

Referring to FIG. 10C, if a dynamic block includes visibility states or a look-up table, the user can define the dynamic block so that the only grip that is displayed is a look-up grip 86. When the look-up grip is clicked on a block instantiation, a drop-down list 87 is displayed. The drop-down list 87 includes a list of available visibility states for the block. When an item from the list 87 is selected, the display of the block instantiation can change accordingly. For example, the list 87 shown includes the angles 30, 45, 60 and 90 degrees, meaning there are four visibility states and in each state the stated angle is the angle of the door relative to a horizontal line. The drawing to the left shows the door at an angle of 30 degrees, whereas the drawing to the right shows the door at an angle of 60 degrees. Each drawing represents a different visibility state of the block.

In one implementation, grips are automatically added at key points on the parameter. However, in one implementation, a user can reposition a grip anywhere in the block space relative to the grip's associated key point on the parameter. When a grip is repositioned, it is still tied to the key point with which it is associated. No matter where the grip is shown in the block instantiation, it will still manipulate the key point with which it is associated. If a user moves or changes the key point of the parameter, the grip's position relative to the key point is maintained.

Visibility states can be used to make geometry visible or invisible in a dynamic block. One block can have any number of visibility states. Using visibility states is a powerful way to create a dynamic block that has many different graphical representations. For example, referring to FIG. 11A, four different weld symbols 88, 89, 90 and 91 are shown. Using visibility states, the four weld symbols 88-91 can be combined into a single dynamic block. Referring to FIG. 11B, an example of the geometry of a combined weld symbol 92 is shown. After combining the geometry in the block editor, the user can add a visibility parameter. A visibility parameter is not associated with an action. The user can create and name a different visibility state for each of the weld symbols 88-91, for example, WLD1, WLD2, WLD3 and WLD4. The user can make particular geometry visible or invisible for each of the four states.

Figure 11A:
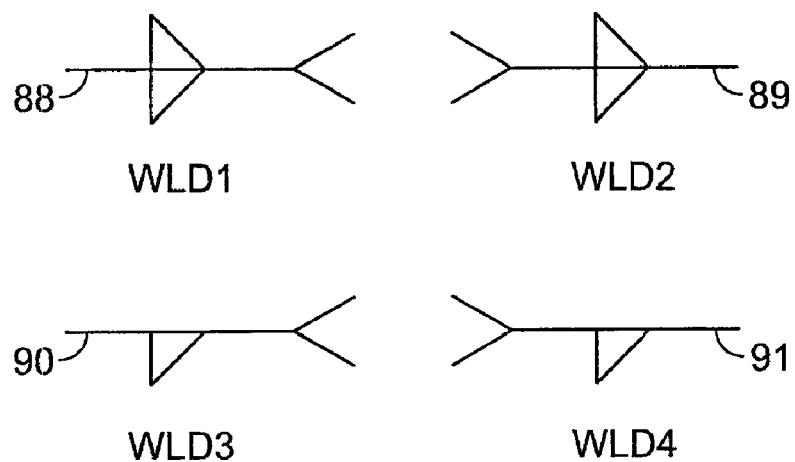
Figure 11B:
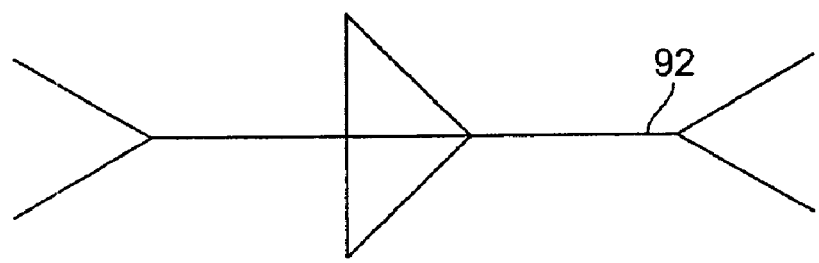

Referring to FIG. 11C, the WLD1 visibility state is displayed in the block editor. The geometry that displays in a dimmed state is invisible for the WLD1 visibility state. Note how the WLD1 visible geometry corresponds to the weld symbol 88 shown in FIG. 11A. The visibility parameter includes a look-up grip 93. This grip is displayed in a block instantiation that includes visibility states. Referring to FIG. 11D, when a user clicks the grip 93 in a block instantiation, a drop-down list 94 of all of the visibility states in the block instantiation is displayed. The user can select one of the states from the list 94 and the geometry that is visible for the state is displayed in the drawing.

Value Sets

A user can define a value set for a linear, polar, XY or rotation parameter. A value set is a range or list of values specified for a parameter. These values can be displayed for a block instantiation as a drop-down list next to the parameter label under custom in the properties palette. When a user defines a value set for a parameter, the parameter is limited to these values when the block instantiation is manipulated in a drawing. For example, if a user defines a linear parameter in a dynamic block that represents a window to have a value set of 20, 40 and 60, then the window can only be stretched to 20, 40 or 60 units. In one implementation, when a user creates a value list for a parameter, the value of the parameter as it exists in the master block definition is automatically added to the value set. This is the default value for the block instantiation when inserted into a drawing. In one implementation, if a user changes a parameter's value to a value other than one in the list, the parameter will adjust to the closest valid value.

Chain Actions

In one implementation, polar, linear, XY and rotation parameters have a property called "Chain Actions". This property affects the parameter behavior if the parameter is part of an action's selection set. For example, a user may include a point parameter in the selection set of a stretch action that is associated with a linear parameter. When the linear parameter is edited in a block instantiation, its associated stretch action triggers a change in its selection set. Because the point parameter is included in the selection set, the point parameter is edited by the change in the linear parameter. Referring to FIG. 12A, an example of a dynamic block 95 in a block editor is shown. The point parameter 96 is included in the stretch action's selection set. If the Chain Actions property for the point parameter is set to "Yes", then a change in the linear parameter will trigger the move action associated with the point parameter, just as if the user edited the point parameter in the block instantiation, e.g., through a grip or custom property. That is, in the example shown in FIG. 12B, the circle 97 will move. Referring to FIG. 12C, if the Chain Actions property is set to "No", then the point parameter's associated move action is not triggered by the changes to the linear parameter, thus the circle 97 does not move.

The master block definition of a dynamic block can be modified in the block editor. A user can delete, add and modify the parameters, actions, geometry, visibility states, look-up tables, grips and properties. The master block definition can then be saved in the block editor. In one implementation, the current values of the geometry and parameters in the dynamic block are set as default values for instantiations of the block.

Described above are tools and techniques for creating and editing a master block definition for a dynamic block, and uniquely modifying—to the extent allowable by the master block definition—instantiations of the dynamic block in a drawing. The following is a description of one example of a data structure or data structures that can be used for creating and storing said master block definitions and block instantiations.

Referring to FIG. 13, a class diagram 98 is shown illustrating classes and objects that can be used to implement a dynamic block feature. Elements in the class diagram 98 and additional class and object information is described in the table shown in FIG. 14. The table includes the name of a particular element, the type of the element and a description of the element.

Referring to FIG. 15, a portion of the class diagram 90 of FIG. 13 is shown. The class diagram 140 in FIG. 15 only includes the classes and objects used when instantiating a dynamic block without performing any manipulations. An AcDb database 120 includes an AcDb Block Table 122. The AcDb Block Table 122 can include multiple block table records (i.e., 1 to n). An AcDb Block Table Record 124 is shown that includes the master block definition of the dynamic block 103. An AcDb Extension Dictionary 126 is attached to the AcDb Block Table Record 124. Generally, an AcDb Dictionary is an object that includes a collection of names (strings) and object pairs (AcDb objects) and when attached to another object in an AcDb database is referred to as an AcDb Extension Dictionary.

An object, such as the dynamic block 103, can include a number of manipulatable entities, e.g., the inner entity 108 and the outer entity 110. Entities of an object can depend on other entities of the object. Dependency relationships between entities of an object can be described by a dependency graph. A dependency graph includes linked nodes, each node having a value. Recording the values of the nodes can record per instance data for a block instantiation. When the user creates the dynamic block 103, thereby defining the master block definition, the AcDb Evaluation Graph 128, which in one implementation is a dependency graph, is generated. The master block definition includes the geometry of the dynamic block 103, the allowed manipulations and the initial values of the nodes in AcDb Evaluation Graph 128.

The AcDb Dynamic Block Purge Preventer 130 optionally can be included in the AcDb Extension Dictionary 126. The AcDb Dynamic Block Purge Preventer 130 can include a piece of a data to ensure the AcDb Block Table Record 124 attached to the AcDb Extension Dictionary 126 is not purged even if there is no AcDb Entity directly pointing to the AcDb Block Table Record 124.

AcDb Block Table Records include AcDb Entities 134; an AcDb Block Reference 132 is a kind of AcDb Entity 134. There can be none, one or more AcDb Block References referring to the same AcDb Block Table Record, i.e., the master block definition. For each block instantiation of the dynamic block 103 that has not been manipulated relative to the dynamic block 103 (i.e., maintains the original appearance of the dynamic block 103), there is an AcDb Block Reference 132 that refers to the AcDb Block Table Record 124 including the master block definition. An AcDb Extension Dictionary 136 is attached to the AcDb Block Reference 132 and can include information related to the AcDb Block Reference 132.

Referring again to FIG. 1, block instantiation 102 is an instance of the dynamic block 103 that has not been manipulated. Referring now to FIG. 15, in one example, the AcDb Block Reference 132 can represent the block instantiation 102. The block instantiation 102 refers to the master block definition. The master block definition, i.e., AcDb Block Table Record 124, includes the geometry of the dynamic block 103. The block instantiation 102 can be drawn using the master block definition.

Referring back to FIG. 1, block instantiation 106 is in the process of being manipulated. Once the changes to the block's appearance are accepted by the user, the block instantiation 106 will appear different than an un-manipulated block instantiation, e.g., block instantiation 102. Block instantiation 104 is an example of a block instantiation that has been manipulated. In this example, the inner entity 108 has been moved from the upper right corner of the outer entity 110 to the lower right corner.

Referring now to FIG. 16, a class diagram 140 is shown. In this class diagram 140, the AcDb Block Reference 142 represents the manipulated block instantiation 104. A manipulated block instantiation, e.g., block instantiation 104, does not refer to the AcDb Block Table Record 124 representing the master block definition. Rather, once changes to the block instantiation 104 are accepted, an "anonymous block definition" is generated. AcDb Block Table Record 144 includes the anonymous block definition. The AcDb Block Reference 142 representing the block instantiation 104 refers to the AcDb Block Table Record 144 including the anonymous block definition. The anonymous block definition includes the geometry of the block instantiation 104. In one implementation, the anonymous block definition is generated by making a copy of the contents of the master block definition and recording the manipulations to the block instantiation's geometry, thereby recording the geometry of the manipulated block instantiation 104. The block instantiation 104 can be drawn using the anonymous block definition.

The class diagram 140 for a manipulated block instantiation 104 further can include a number of additional elements. An AcDb Block Representation 148 is included in the AcDb Extension Dictionary 146 attached to the AcDb Block Reference 142. The AcDb Block Representation 148 includes an AcDb Xrecord 150. Generally, an Xrecord is an object that includes a linked list of typed values (e.g., strings, longs, integers, etc.). The AcDb Xrecord 150 includes a pointer to the master block definition, i.e., a pointer to the AcDb Block Table Record 124 shown in FIG. 14. Thus, although the AcDb Block Reference 142 refers to the anonymous block definition, i.e., AcDb Block Table Record 144, the AcDb Block Reference 154 still includes a pointer to the master block definition. The pointer to the master block definition is needed to retrieve the AcDb Evaluation Graph 128, i.e., when the master block definition has been modified the anonymous block definition is changed or replaced, as discussed further below.

The AcDb Block Representation 148 can further include an Application Data Cache 152. The Application Data Cache 152 can include three objects including an Enhanced Block Data AcDb Dictionary 154, an Enhanced Block History AcDb Xrecord 156 and an Enhanced Block Hdata AcDb Dictionary 158.

The Enhanced Block Data AcDb Dictionary 154 can include one or more Graph Node ID AcDb Xrecords 160 and can be configured to record per instance data. As discussed above, the master block definition includes an AcDb Evaluation Graph 128 (e.g., a dependency graph) setting forth the relationship of the entities forming the dynamic block 103 to one another and the defining the permissible manipulations. In other implementations, a data structure other then a dependency graph can be used. When a dependency graph is used, the per instance values of the nodes of the dependency graph for the block instantiation 104 are recorded as Graph Node ID AcDb Xrecords 160 in the Enhanced Block Data AcDb Dictionary 154.

The Enhanced Block History AcDb Xrecord 156 includes a history of manipulations of the block instantiation 104. In one implementation, a history is recorded if the interdependencies of the nodes is such that when multiple property changes are applied to block instantiations, the anonymous block definitions that result are different, depending on the order in which the property changes were applied. As mentioned above, an Xrecord is a chain of values. In the case of the Enhanced Block History AcDb Xrecord 156, a sequence of operations is stored as values in a chain. For each operation, a value is added to the chain, which continues to grow. For example, referring again to FIG. 2, a block instantiation can be edited by moving grip 112 to move the inner entity 108 relative to the outer entity 110. An identifier of the grip 112 that was moved and the coordinates of the position of the grip 112 can be recorded as values in the Enhanced Block History AcDb Xrecord 156 to record the move operation. One or more compression algorithms can be used to reduce the number of items in an Xrecord chain, which is discussed in further detail below.

The Enhanced Block Hdata AcDb Dictionary 158 includes one or more Graph Node ID AcDb Xrecords. The Enhanced Block Hdata AcDb Dictionary 158 is used to record a "pseudo history" of the block instantiation 104. A pseudo history can be required when a dynamic block 103 initially did not include interdependencies making the sequence of operations significant, and therefore a history of manipulations was not recorded. However, if the dynamic block 103 and therefore the master block definition is subsequently modified to introduce such interdependencies, then going forward a history of manipulations is recorded in the Enhanced Block History AcDb Xrecord 156 described above. The pseudo history captures the state of a block instantiation just before the modification to the master block definition. The per instance data of the block instantiation 104 is recorded as Graph Node ID AcDb Xrecords 162 in the Enhanced Block Hdata AcDb Dictionary 158; the per instance data forms the pseudo history.

A modification to the master block definition, e.g., a modification introducing interdependencies as discussed above, affects all instances of the dynamic block 103. For example, a change to the geometry, such as modifying the inner entity 108 from a rectangular shape to a circular shape, is replicated to all instances of the dynamic block 103, including the block instantiations 102, 104 and 106.

When the master block definition is modified, the existing anonymous block definitions are replaced or modified. For example, referring again to FIG. 1, block instantiation 102 has not been manipulated and therefore refers to the AcDb Block Table Record 124 including the master block definition. Block instantiations 104 and 106 have been manipulated and therefore each refer to an AcDb Block Table Record including an anonymous block definition. As already discussed above, block instantiation 104 refers to AcDb Block Table Record 144 including the anonymous block definition of the block instantiation 104. Block instantiation 106 refers to a different AcDb Block Table Record that includes the anonymous block definition of that block instantiation.

In one implementation, when the master block definition is modified, the AcDb Block Table Record 144 is replaced by a new AcDb Block Table Record that includes a new anonymous block definition corresponding to the block instantiation 104. The AcDb Block Reference 132 refers to the new AcDb Block Table Record. In another implementation, the AcDb Block Table Record 144 can be modified rather then replaced by a new AcDb Block Table Record. In either implementation, the anonymous block definition for the block instantiation 104 is replaced (or changes) due to the changes to the master block definition.

The "new" anonymous block definition is generated using the modified master block definition and the per instance data (i.e., the node values, history or pseudo history values) for the block instantiation. That is, the per instance node values for the block instantiation 104, which were recorded in the Graph Node ID AcDb Xrecords 160, are used to populate the AcDb Evaluation Graph 128 of the modified master block definition. The AcDb Evaluation Graph 128 is evaluated with the per instance values of the block instantiation 104 and evaluating the graph generates the anonymous block definition with the new geometry. When a history is not present, the per instance values are individually applied to the graph and the entire graph is evaluated (i.e., a value is applied, the graph is evaluated; this is repeated for each per instance value until all have been applied and evaluated).

If a history of manipulations of the block instantiation 104 was being recorded in the Enhanced Block History AcDb Xrecord 156 (i.e., if the master block definition before the modification included interdependencies where sequence of operations was significant), then the history of manipulations is also used when evaluating the AcDb Evaluation Graph 128. When a history is present, the per instance values stored in the ACAD_EnhancedBlockData dictionary 154 are not used. Instead, the individual history changes are applied by individually setting the properties and evaluating the graph in the order in which they appear in the history (oldest first). If a pseudo-history is also present, the pseudo-history values are applied prior to replaying the history in exactly the same way that per instance data values are applied.

Referring now to FIG. 17, a flow chart is shown illustrating a process 200 for generating a block instantiation, e.g., block instantiation 104, that has been manipulated relative to the original dynamic block 103 appearance. A master block definition is created (step 202). For example, in the block editor mode shown in FIG. 2, a user can draw inner and outer entities, position them relative to one another, and identify permissible manipulations, e.g., move and rotate. A block instantiation is created (step 204). For example, the user can select to generate an instance of the dynamic block 103 in a CAD design. Initially, the block instantiation appears identical to the dynamic block 103, for example, block instantiation 102. User input is received to manipulate the block instantiation (step 206). For example, block instantiation 106 is in the process of being manipulated as shown in FIG. 1; user input has been received manipulating the angle of the inner entity 108. Once the user manipulates the block instantiation 104 relative to the dynamic block 103, a clone of the master block geometry, i.e., AcDb Block Table Record 124 (FIG. 14), is generated and forms the anonymous block definition, i.e., AcDb Block Table Record 144 (FIG. 15) (step 208). Additionally, the manipulations of the block instantiation 104 are recorded and included in the anonymous block definition (step 210). For example, the manipulations are recorded by creating an AcDbBlockRepresentation dictionary 142 and associated data (AppDataCache 152, ACAD_EnhancedBlockData dictionary 154, graph node data 160 and optionally ACAD_EnhancedBlockHistory 156).

In one implementation, a compression algorithm can be used to reduce the number of entries of an Xrecord chain (e.g., the Enhanced Block History AcDb Xrecord) and/or to reduce the number of anonymous block definition AcDb Block Table Records. One example of a compression technique is described below, although other compression techniques can be used.

For illustrative purposes, consider that dynamic block 103 has interdependent properties "P" and "Q" with current values of "P0" and "Q0". A user attempts to change the value of "P" to "P1", resulting in an actual value for "P" of "P2". To capture this change for a block instantiation, e.g., block instantiation 104, the property being changed is captured, i.e., "P" and the final value after the requested operation has been performed, i.e., "P2", is captured. The final property value is captured instead of the requested property value, i.e., "P1", to avoid interpretation of requested operations that are a by-product of applying the requested operation.

The following example illustrates the above described concept. A Linear Distance parameter in the dynamic block 103 may include a "Distance" property, which is constrained to values of 30, 36 and 40. If the user requests, e.g., either through grip editing or via a property palette, that the "Distance" become 34, the graph evaluation (i.e., the evaluation of AcDb Evaluation Graph 128 (FIG. 15)) results in a properly constrained value, in this example, 36. If the "requested" value (i.e., 34) had been recorded instead of the final value, then changes to the allowed set of constraints in the master block definition might result in unexpected changes when the history of manipulations of the block instantiation 104 is later replayed. For example, if the user subsequently changes the master block definition to allow constrained values of 30, 33, 36 and 40 and the requested history change of 34 was applied, the "Distance" property for the block instantiation would become 33, even though its prior value, i.e., 36, was still valid. When replaying a block instantiation's history, the user operations are replayed in the order in which they are recorded.

Drawing space can be saved by compressing the history of manipulations saved for each block instantiation. As mentioned previously, the history for block instantiations of a dynamic block that does not have interdependent properties or operations can be omitted. In one implementation, a history is recorded if one of the following conditions is satisfied:

Any action that maintains an action selection set causes a history to be maintained if any object in the action selection set is another authoring element. The exception to this is a visibility parameter, which has visibility states (akin to a selection set) but never requires a history to be maintained.

If an action, e.g., A1, has in its action selection set an entity that is also in the action selection set of another action, e.g., A2, then a history will be maintained if A1 is an array, flip, rotate, stretch or polar stretch action.

If a history is maintained, then the history itself can be selectably compressed. In one implementation, compression depends on the parameter whose property has changed as a result of an operation. For example, by the AcDbBlockElement can include a HistoryCompression parameter, which has the following values:

kNoCompression
  A complete history for the element is maintained. No compression is performed, each change to the element is persisted for the lifetime of the history.
kCompressAdjacent
  If the same property is changed by consecutive operations, only the most recent operation is maintained. For example, if a block has properties P and Q, both of which support kCompressAdjacent, and are manipulated to the following values in the following order: P1, P2, P3, Q1, Q2, P4, Q3; then the consecutive changes to P and Q are compressed in the history so that only the last entry in a chain is retained, i.e., P3, Q2, P4, Q3.
kCompressAll
  Only the most recent property change is retained, and all preceding operations for a given property are discarded. Using the example above for kCompressAdjacent, if P supports kCompressAll, then the resulting compressed history becomes: Q2, P4, Q3.

In one implementation, grip editing operations are compressed in a fashion similar to kCompressAdjacent, described above. In one implementation, grip operations are captured as a vector offset, instead of an absolute grip position, and the adjacent grip edit history entries are combined by adding their vectors.

In another implementation, drawing space can also be more efficiently used by re-using anonymous block definitions when two block instantiations are determined to be "equivalent" to one another. Two block instantiations without histories are considered equivalent if they are instances of the same dynamic block, e.g., dynamic block 103, and if all of their per-instance dynamic block properties (i.e., per instance data node values) are equal. In one implementation, two block instantiations with histories are considered equivalent if they are instances of the same dynamic block and their history of property changes are equal entry-for-entry. The comparison of the per-instance properties (i.e., per instance data node values) in this case is unnecessary, since applying the same changes to two graphs starting out in the same state results in the same final graph state.

In one implementation, when an anonymous block definition is generated to represent a block instantiation, the anonymous block definition is compared to other anonymous block definitions generated from the same dynamic block 103. If two anonymous block definitions have the same number of entities and total extents, then a detailed comparison of the block instantiation's parameters is performed. If all comparisons succeed, the anonymous block definitions are considered to be "equivalent" and all of the dependent references are updated to point to one of the anonymous block definitions and the other is deleted.

In one implementation, an AcDbBlockRefContext class is the object through which user operations on instances of a dynamic block are performed. For example, grip editing and property palette can funnel though this class. The class is responsible for obtaining the AcDb Evaluation Graph 128 from the master block definition (i.e., AcDb Block Table Record 124), initializing the AcDb Evaluation Graph 128 with per-instance data cached on the block instantiation 104 (i.e., in the Enhanced Block Data AcDb Dictionary 154), applying changes to the AcDb Evaluation Graph 128 for a requested operation and updating the per-instance data on the block instantiation 104 with the updated data. Side effects of this process can include the creation of anonymous block definitions by cloning the master block definition, or even another anonymous block definition, via the AcDbBlockRepresentation 148 complex, manipulation of objects in the anonymous block definition 144, and traversing the AcDb Database 120 to maximize the re-use of anonymous block definitions.

As was discussed above, a user can modify a master block definition, and modifications are then replicated to existing block instantiations. The AcDb Evaluation Graph 128 is traversed as the graph is initialized, but before changes are applied, to determine if any authoring elements require a history to be maintained. If a history is required, after applying changes to the master block definition, a history entry for the property can be appended to the end of the existing history chain. When propagating changes made to the master block definition of the dynamic block 103, e.g., to the block instantiation 104, the ACAD_EnhancedBlockData 154 dictionary is replaced after all of the properties for the instance have been reapplied, either by re-applying the per instance values (as recorded in the Enhanced Block Data AcDb Dictionary 154) or by re-applying the history (as recorded in the Enhanced Block History AcDbXrecord 156). The block instantiation's history is maintained as a resbuf chain in the Enhanced Block History AcDbXrecord 156. If the new master block definition does not require a history, then any existing history (i.e., Enhanced Block History AcDbXrecord 156) and pseudo-history (i.e., ACAD_EnhancedBlockHdata 158) is discarded. If a history is required and one already existed, then the existing history is saved with the caveat that individual history entries for properties that no longer exist in the master block definition are removed from the history chain. In one implementation, the resbuf chain includes a single version header resbuf, followed by triplet resbufs including a single history entry maintaining the AcDb Evaluation Graph Node ID, Property Name that changed and final Property Value.

The above description of classes and objects that can be used to implement a dynamic block feature are illustrative of one implementation, however, other techniques can be used to implement such a feature. Other structures and formats for data are possible. In one implementation, the data is configured to be included in a .DWG or .DXF (Document eXchange Format). These file formats are compatible with CAD software such as AutoCAD available from Autodesk, Inc. of San Rafael, Calif.

The invention and the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As described above, a block editor can be provided, the block editor being implemented in software, firmware and/or hardware. In one implementation, the block editor is a tool executing in a CAD software application and provides a user interface for receiving input from a user. The input can be transformed into one or more of the data structures described herein that can be used to implement a dynamic block feature. The block editor can provide one or more tools in the user interface for receiving user interaction, for example, manipulatable grips or menu palettes for receiving user selections.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:
1. A method implemented by data processing apparatus, the method comprising:
   identifying, by the data processing apparatus, a first block, the first block representing a two or three dimensional object in a Computer Aided Design (CAD) model, the first block having a visual presentation in a presentation of the CAD model based on a first plurality of property values denoted by a first label in a plurality of labels, and in which prior user interaction with the visual presenta- tion caused a presentation of the plurality of labels, and in which user input was received selecting the first label from the presentation of the plurality of labels;

receiving, by the data processing apparatus, user input specifying a new value for first property value in the first plurality of property values;

in response to receiving the user input specifying the new value, selecting by the data processing apparatus a different second plurality of property values denoted by a second label, the second plurality of property values differing by at least one value from the first plurality of property values, and the second plurality of property values having a second property value that is satisfied by the new value;

updating the visual presentation of the first block based on the second plurality of property values.

2. The method of claim 1 where the updating includes:
changing a shape or appearance of the first block.

3. The method of claim 1, further comprising:
receiving user input changing the second label to a third label, the third label in the plurality of labels and denoting a third plurality of property values differing by at least one value from the second plurality of property values and the first plurality of property values; and
updating the visual presentation of the first block based on the third plurality of property values.

4. The method of claim 1 where:
a property value is a single value or a range of values.

5. The method of claim 1 where:
the first property value specifies a physical size of the first block.

6. The method of claim 5 where:
the size property value includes parameters.

7. The method of claim 6 where:
the parameters are associated with more than two dimensions.

8. The method of claim 1 where:
the first plurality of property values includes a visibility property value, the visibility property value indicating if at least a portion of the first block is visible in the presentation of the first block.

9. The method of claim 1 where:
the first property value is associated with a two-way constraint with a property value of a second block, the two-way constraint being a requirement that a change to the first property value affects a property value of the second block, and vice versa.

10. The method of claim 1 where:
the first property value is associated with a one-way constraint with a property value of a second block, the one-way constraint being a requirement that a change to the first property value affects a property value of the second block.

11. A computer program product, encoded on a computer-readable storage device, comprising instructions operable to cause a data processing apparatus to perform operations comprising:

identifying a first block, the first block representing a two or three dimensional object in a Computer Aided Design (CAD) model, the first block having a visual presentation in a presentation of the CAD model based on a first plurality of property values denoted by a first label in a plurality of labels, and in which prior user interaction with the visual presentation caused a presentation of the plurality of labels, and in which user input was received selecting the first label from the presentation of the plurality of labels;

receiving user input specifying a new value for a first property value in the first plurality of property values;

in response to receiving the user input specifying the new value, select a second plurality of property values denoted by a second label, the second plurality of property values differing by at least one value from the first plurality of property values, and the second plurality of property values having a second property value that is satisfied by the new value; and updating the visual presentation of the first block based on the second plurality of property values.

12. The computer program product of claim 11 wherein the operations further comprise:
changing a shape or appearance of the first block.

13. The computer program product of claim 11, wherein the operations further comprise:
receiving user input changing the second label to a third label, the third label in the plurality of labels and denoting a third plurality of property values differing by at least one value from the second plurality of property values and the first plurality of property values; and
updating the visual presentation of the first block based on the third plurality of property values.

14. The computer program product of claim 11 where:
a property value is a single value or a range of values.

15. The computer program product of claim 11 where:
the first property value specifies a physical size of the first block.

16. The computer program product of claim 15 where:
the size property value includes parameters.

17. The computer program product of claim 16 where:
the parameters are associated with more than two dimensions.

18. The computer program product of claim 11 where:
the first plurality of property values includes a visibility property value, the visibility property value indicating if at least a portion of the first block is visible in the presentation of the first block.

19. The computer program product of claim 11 where:
the first property value is associated with a two-way constraint with a property value of a second block, the two-way constraint being a requirement that a change to the first property value affects a property value of the second block, and vice versa.

20. The computer program product of claim 11 where:
the first property value is associated with a one-way constraint with a property value of a second block, the one-way constraint being a requirement that a change to the first property value affects a property value of the second block.

21. A system comprising:
data processing apparatus operable to execute instructions that cause the data processing apparatus to perform operations comprising:

identifying a first block, the first block representing a two or three dimensional object in a Computer Aided Design (CAD) model, the first block having a visual presentation in a presentation of the CAD model based on a first plurality of property values denoted by a first label in a plurality of labels, and in which prior user interaction with the visual presentation caused a presentation of the plurality of labels, and in which user input was received selecting the first label from the presentation of the plurality of labels;

receiving user input specifying a new value for first property value in the first plurality of property values;

in response to receiving the user input specifying the new value, selecting a second plurality of property values denoted by a second label, the second plurality of property values differing by at least one value from the first plurality of property values, and the second plurality of property values having a second property value that is satisfied by the new value; and updating the visual presentation of the first block based on the second plurality of property values.

22. The system of claim 21 in which the operations further comprise changing a shape or appearance of the first block.

23. The system of claim 21 in which the operations further comprise:

receiving user input changing the second label to a third label, the third label in the plurality of labels and denoting a third plurality of property values differing by at least one value from the second plurality of property values and the first plurality of property values; and updating the visual presentation of the first block based on the third plurality of property values.

24. The system of claim 21 in which a property value is a single value or a range of values.

25. The system of claim 21 in which the first property value specifies a physical size of the first block.

26. The system of claim 25 in which the size property value includes parameters.

27. The system of claim 26 in which the parameters are associated with more than two dimensions.

28. The system of claim 21 in which the first plurality of property values includes a visibility property value, the visibility property value indicating if at least a portion of the first block is visible in the presentation of the first block.

29. The system of claim 21 in which the first property value is associated with a two-way constraint with a property value of a second block, the two-way constraint being a requirement that a change to the first property value affects a property value of the second block, and vice versa.

30. The system of claim 21 in which the first property value is associated with a one-way constraint with a property value of a second block, the one-way constraint being a requirement that a change to the first property value affects a property value of the second block.

* * * * *

UNITED STATES PATENT AND TRADEMARK OFFICE
CERTIFICATE OF CORRECTION

| | | |
|---|---|---|
| PATENT NO. | : 7,978,206 B2 | Page 1 of 1 |
| APPLICATION NO. | : 11/564104 | |
| DATED | : July 12, 2011 | |
| INVENTOR(S) | : John G. Ford, III | |

It is certified that error appears in the above-identified patent and that said Letters Patent is hereby corrected as shown below:

Column 25, Line 5 after "for" insert -- a --

Column 25, Line 14 after "values;" insert -- and --

Column 25, Line 56 after "cause" delete "a"

Column 26, Line 66 after "for" insert -- a --

Signed and Sealed this
Seventh Day of February, 2012

David J. Kappos
*Director of the United States Patent and Trademark Office*